(12) United States Patent
Shimbo et al.

(10) Patent No.: US 11,323,344 B2
(45) Date of Patent: May 3, 2022

(54) DATA PROCESSING METHOD, EDGE DEVICE, AND DATA PROCESSING SYSTEM

(71) Applicant: HITACHI, LTD., Tokyo (JP)

(72) Inventors: Kenichi Shimbo, Tokyo (JP); Tadanobu Toba, Tokyo (JP); Masaharu Kinoshita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/355,251

(22) Filed: Jun. 23, 2021

(65) Prior Publication Data
US 2022/0060399 A1 Feb. 24, 2022

(30) Foreign Application Priority Data
Aug. 21, 2020 (JP) .............................. JP2020-140295

(51) Int. Cl.
| | |
|---|---|
| *H04L 1/18* | (2006.01) |
| *H04L 1/00* | (2006.01) |
| *H04L 29/08* | (2006.01) |
| *H04L 67/12* | (2022.01) |
| *H04L 43/08* | (2022.01) |
| *G16Y 30/10* | (2020.01) |
| *H04N 13/194* | (2018.01) |
| *H04N 13/106* | (2018.01) |
| *G06F 12/00* | (2006.01) |
| *G06F 15/167* | (2006.01) |

(52) U.S. Cl.
CPC .............. *H04L 43/08* (2013.01); *G16Y 30/10* (2020.01); *H04L 67/12* (2013.01)

(58) Field of Classification Search
USPC ....... 709/224, 217, 227, 213, 238, 226, 218, 709/229, 206, 203
See application file for complete search history.

(56) References Cited

U.S. PATENT DOCUMENTS

| | | | | |
|---|---|---|---|---|
| 7,127,502 B1 * | 10/2006 | Nishikado | ........... | G06F 16/9574 709/227 |
| 8,516,193 B1 * | 8/2013 | Clinton | ............... | H04L 67/1097 711/108 |
| 11,044,457 B2 * | 6/2021 | Xia | ...................... | H04N 13/194 |

(Continued)

FOREIGN PATENT DOCUMENTS

JP 2020-004414 A 1/2020

*Primary Examiner* — Jude Jean Gilles
(74) *Attorney, Agent, or Firm* — Volpe Koenig

(57) ABSTRACT

A data processing method is performed by an edge device acquiring collected data from a collection target and a first computer capable of communicating with the edge device. The method includes: a first calculation process of, by the edge device, storing the collected data in a secure region to which referring of internally stored information from outside is not allowable and calculating first data which has a data amount less than the collected data and is irreversible in the secure region based on the stored collected data; a first communication process of, by the edge device, transmitting the first data calculated through the first calculation process to the first computer; and a second calculation process of, by the first computer, calculating second data based on the first data transmitted from the edge device through the first communication process.

15 Claims, 13 Drawing Sheets

(56) References Cited

U.S. PATENT DOCUMENTS

| | | | |
|---|---|---|---|
| 2003/0135411 A1* | 7/2003 | Ushiki | H04L 63/145 |
| | | | 709/246 |
| 2012/0324109 A1* | 12/2012 | Kohli | H04L 67/2819 |
| | | | 709/226 |
| 2017/0064037 A1* | 3/2017 | Das | H04W 4/18 |
| 2020/0007409 A1 | 1/2020 | Kim et al. | |
| 2020/0293477 A1* | 9/2020 | Lefebvre | G06F 21/606 |
| 2020/0301687 A1* | 9/2020 | Nakagawa | G06F 8/61 |
| 2020/0341819 A1* | 10/2020 | Amemiya | G06F 9/5038 |
| 2021/0183244 A1* | 6/2021 | Malhan | B64D 47/08 |
| 2021/0203992 A1* | 7/2021 | Xu | G06T 9/002 |

* cited by examiner

DATA PROCESSING METHOD, EDGE DEVICE, AND DATA PROCESSING SYSTEM

CLAIM OF PRIORITY

The present application claims priority from Japanese patent application JP 2020-140295, filed on Aug. 21, 2020, the content of which is hereby incorporated by reference into this application.

BACKGROUND OF THE INVENTION

1. Field of the Invention

The present invention relates to a data processing method processing data, an edge device, and a data processing system.

2. Description of Related Art

Edge computing systems are Internet-of-things (IoT) platforms in which an edge distributed process is utilized and generally have advantages of improving communication stability by reducing communication cost and reducing traffic, and continuing real-time data processing and offline services. To provide new data utilization services with these advantages, there is an increase in needs for service providers to implement some of important programs of the own companies using artificial intelligence (AI) technologies or know-how in edge-side IoT devices owned by users.

JP-A-2020-4414 discloses an intelligent IoE edge computing system. The intelligent IoE edge computing system has an automatically driven IoT information framework and edge computing entities modularized to be applied to various applications in edge-node-based time-series data prediction and decision technologies and services based on these technologies so that intelligent traffic is analyzed and predicted.

In edge computing systems, the number of IoT devices serving as edges is large and a life cycle is also long. Accordingly, IoT devices have problems in that a possibility of physical attacks is high and a security risk such as leakage or falsification of not only collected data but also implemented programs is high when important processes are implemented in the IoT devices. In the cases of devices in which high safety is required as in connected cars, it is difficult for third parties other than device managers (manufacture makers) to implement programs in some cases in order to guarantee safety.

SUMMARY OF THE INVENTION

An objective of the present invention is to provide secure data processing to reduce communication and calculation loads.

According to an aspect of the present invention disclosed in the present specification, a data processing method is performed by an edge device acquiring collected data from a collection target and a first computer capable of communicating with the edge device. The method includes: a first calculation process of, by the edge device, storing the collected data in a secure region to which referring of internally stored information from outside is not allowable and calculating first data which has a data amount less than the collected data and is irreversible in the secure region based on the stored collected data; a first communication process of, by the edge device, transmitting the first data calculated through the first calculation process to the first computer; and a second calculation process of, by the first computer, calculating second data based on the first data transmitted from the edge device through the first communication process.

According to representative embodiments of the present invention, it is possible to provide secure data processing to reduce communication and calculation loads. Problems, configurations, and advantages other than the above description area are apparent from the following embodiments to be described below.

DESCRIPTION OF EMBODIMENTS

Embodiment 1

<Application Example of Edge Computing System>

Figure 1:
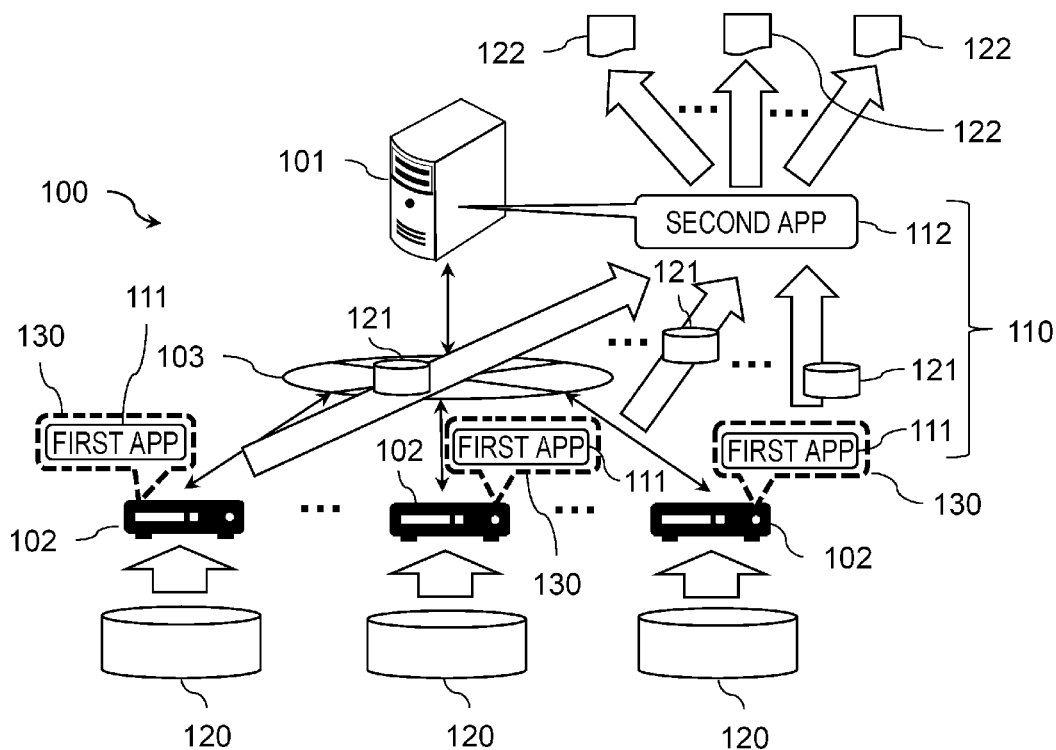
FIG. 1 is a diagram illustrating a running example of an edge computing system according to Embodiment 1.

FIG. 1 is a diagram illustrating a running example of an edge computing system according to Embodiment 1. An edge computing system 100 is a data processing system that includes a service provider server 101 and an IoT device 102 serving as an edge device.

The service provider server 101 and the IoT device 102 are connected to be able to communicate via a network such as the Internet, a local area network (LAN), or a wide area network (WAN). The service provider server 101 is, for example, a computer that is run by a service provider that provides a service to a user of the IoT device 102.

The edge computing system 100 performs an application (hereinafter app) 110. Specifically, for example, the IoT device 102 includes a first app 111 which is pre-processing of the app 110 in a secure region 130. The service provider server 101 includes a second app 112 which is post-processing of the app 110.

The first app 111 is a program that calculates first data 121 from a large amount of detected data 120 detected with sensors or actuators by the IoT device 102 and transmits the first data 121 to the service provider server 101. The detected data 120 is data of which a data amount increases in proportion to the number of installed sensors or actuators or the number of detections. The first app 111 may acquire a control signal or an interruption signal from the outside without being limited to the detected data 120 and may be used to calculate the first data 121. The collected data 120 is a generic term of the detected data 120 and the control signal and the interruption signal from the outside.

The first data 121 is intermediate data generated by the app 110 and is input to the second app 112. The first data 121 is data of which a data amount is less than the detected data. The first data 121 is irreversible data which is not returned to the detected data in the service provider server 101. The first data 121 is, for example, an evaluation value for evaluating a user using the IoT device 102. From the first data 121, it is not known what the first data 121 means.

The secure region 130 is, for example, a region to which a trusted execution environment (TEE) technology is applied. The secure region 130 is managed by a secure OS and configured so that referring of internally stored information from the outside is not allowable. Accordingly, it is difficult to falsify the secure OS, the first app 111, the collected data 120, and the first data 121 stored in the secure region 130.

When a program outside of the secure region 130 of the IoT device 102 is hacked or infected by malware, a possibility of the secure OS, the first app 111, the collected data 120, and the first data 121 in the secure region 130 being destroyed is lower than that in a region to which the TEE technology is not applied. The secure region 130 may be configured by, for example, a hardware security module or a secure element that has physically tamper resistance.

The second app 112 is a program that receives the first data 121 from each IoT device 102 and calculates second data 122 for each IoT device 102. The second data is used for, for example, a service provided by a service provider operating the service provider server 101. The second app 112 calculates data related to a service provided to a user based on the first data 121 which is an evaluation value of the user.

In this way, the first app 111 which is a part of the app 110 is implemented in the IoT device 102 so that the IoT device 102 transmits the first data 121 to the service provider server 101 instead of the collected data 120. Thus, it is possible to achieve a reduction in a transmission data amount.

Since the first app 111, the collected data 120, and the first data 121 are managed in the secure region 130, it is difficult for a user of the IoT device 102 or the third party to falsify the first app 111, the collected data 120, and the first data 121. Accordingly, it is possible to achieve an improvement in safety. The first data 121 is not reversible data which can be returned to the original collected data 120 like compression or encryption but irreversible data. Accordingly, even when the first data 121 is leaked, it is unknown how the first data 121 is used.

The service provider server 101 does not calculate the first data 121 and calculates the second data 122 from the collected data 120 of each IoT device 102. Accordingly, it is possible to achieve a reduction in a processing load of the service provider server 101.

<Hardware Configuration Example of Service Provider Server 101>

Figure 2:
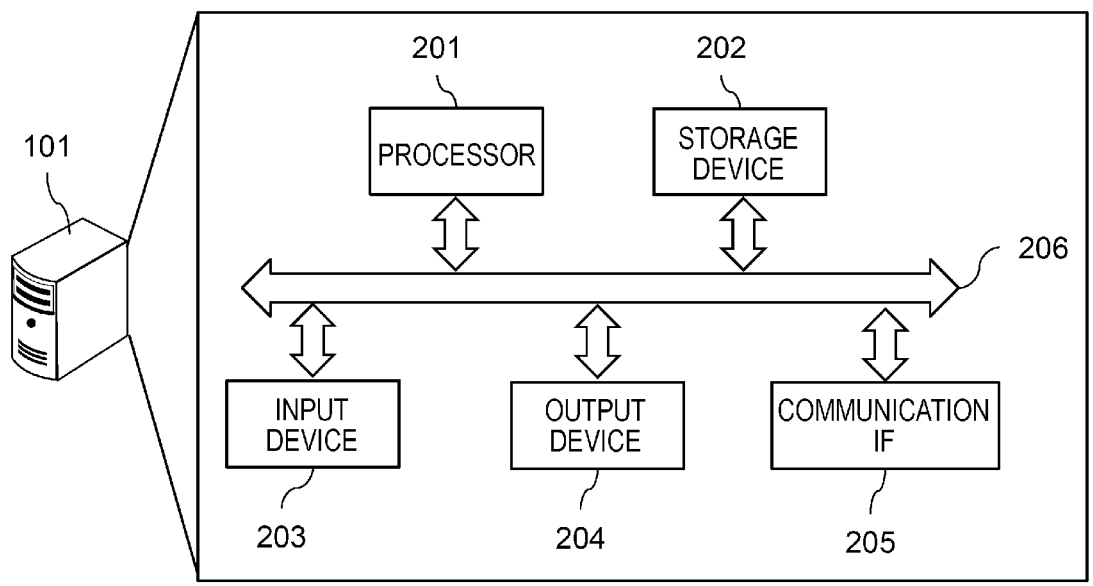
FIG. 2 is a block diagram illustrating a hardware configuration example of a service provider server.

FIG. 2 is a block diagram illustrating a hardware configuration example of the service provider server 101. The service provider server 101 includes a processor 201, a storage device 202, an input device 203, an output device 204, and a communication interface (communication IF) 205. The processor 201, the storage device 202, the input device 203, the output device 204, and the communication IF 205 are connected by a bus 206. The processor 201 controls the service provider server 101. The storage device 202 serves as a work area of the processor 201. The storage device 202 is a non-transitory or transitory recording medium that stores various programs or data. Examples of the storage device 202 include a read-only memory (ROM), a random access memory (RAM), a hard disk drive (HDD), and a flash memory. The input device 203 inputs data. The input device 203 is, for example, a keyboard, a mouse, a touch panel, a numeric key, or a scanner. The output device 204 outputs data. The output device 204 is, for example, a display, a printer, or a speaker. The communication IF 205 is connected to a network 103 to transmit and receive data.

<Hardware Configuration Example of IoT Device 102>

Figure 3:
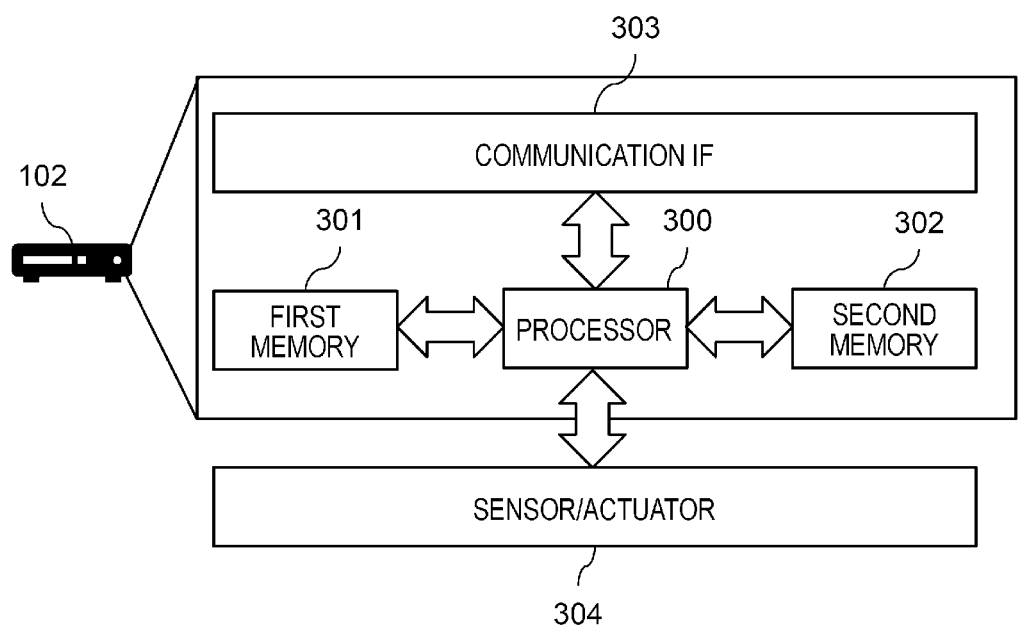
FIG. 3 is a block diagram illustrating a hardware configuration example of an IoT device.

FIG. 3 is a block diagram illustrating a hardware configuration example of the IoT device 102. The IoT device 102 includes a processor 300, a first memory 301, a second memory 302, and a communication IF 303. The IoT device 102 is connected to a sensor/actuator 304.

The processor 300 controls the IoT device 102. Specifically, for example, the processor 300 performs a non-secure normal process using a program stored in the non-secure first memory 301. The processor 300 performs a secure process using a program such as the first app 111 stored in the second memory 302 serving as the secure region 130.

When the processor 300 has a single core, the processor 300 performs a normal process and a secure process in a time-division manner. When there are two processors 300, one of the processors 300 accesses the first memory 301 to perform the normal process and the other processor 300 accesses the second memory 302 to perform the secure process. The same goes for a case in which the processor 300 is a multi-core processor.

The first memory 301 stores a non-secure normal operating system (OS) and a first program that is executed on the normal OS. The first program causes the processor 300 to control the sensor/actuator 304 or perform data processing between the sensor/actuator 304 and the service provider server 101.

The second memory 302 stores a secure OS and a second program executed on the secure OS. The second program includes the first app 111 that calculates the first data 121 based on the collected data 120 acquired with the sensor/actuator 304.

The communication IF 303 is connected to the network 103 to transmit and receive data. The TEE technology is used for the processor 300, the first memory 301, and the second memory 302. According to the TEE technology, the first memory 301 is used as a non-secure normal region and the second memory 302 is used as the secure region 130.

The sensor/actuator 304 includes at least one of one or more sensors or one or more actuators. The sensor detects the IoT device 102, a connection-destination device of the IoT device 102, or information regarding a surrounding environment of the IoT device 102. Examples of the sensor include a camera, an acceleration sensor, a speed sensor, a human sensor, a temperature sensor, a humidity sensor, an acoustic sensor (microphone), a vibration sensor, an infrared depth sensor, an encoder, and a pressure sensor.

The actuator is a mechanical element that converts an input electrical signal into a physical motion. An action of the actuator is detected by the sensor or the actuator is driven in accordance with detected data detected by the sensor. The actuator is, for example, a pressure device such as an electric motor, an electromagnetic solenoid, an oil pressure cylinder, or an air pressure cylinder. In FIG. 3, the sensor/actuator 304 is provided outside of the IoT device 102, but may be provided inside the IoT device 102 as a constituent element of the IoT device 102.

<Functional Configuration Example of Service Provider Server 101>

Figure 4:
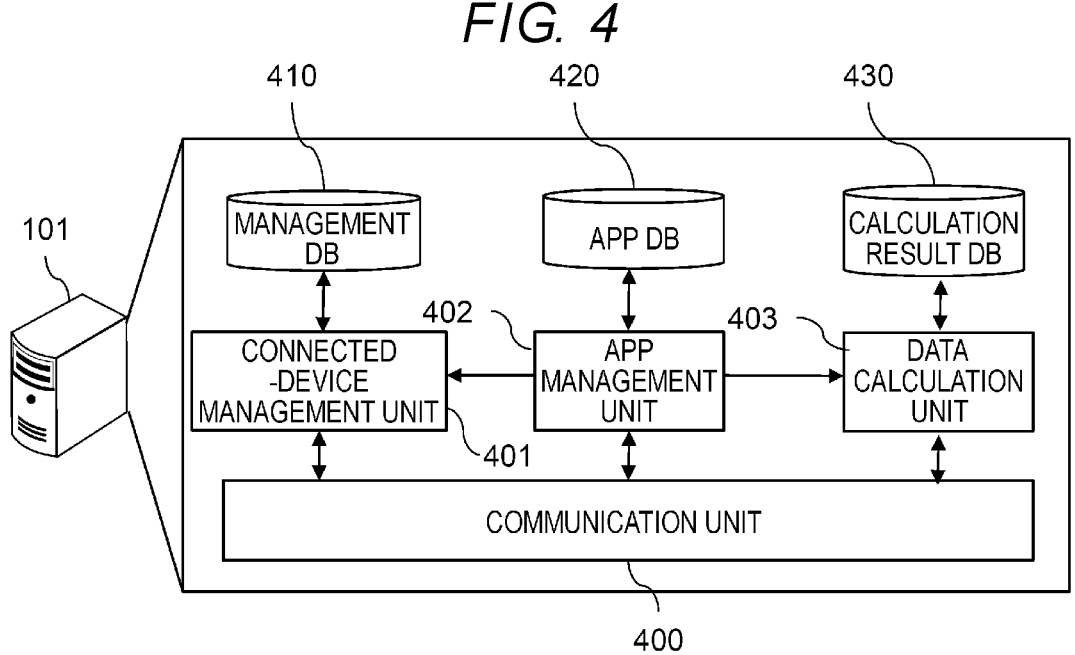
FIG. 4 is a block diagram illustrating a functional configuration example of the service provider server.

FIG. 4 is a block diagram illustrating a functional configuration example of the service provider server 101. The service provider server 101 includes a communication unit 400, a management database (DB) 410, an app DB 420, a calculation result DB 430, a connected-device management unit 401, an app management unit 402, and a data calculation unit 403.

The communication unit 400 receives data such as the first data 121 from the IoT device 102 through the communication IF 304 and transmits data such as an app to the IoT device 102.

The connected-device management unit 401, the app management unit 402, and the data calculation unit 403 are realized specifically, for example, by causing the processor 201 to execute a program stored in the storage device 202 illustrated in FIG. 2. The management DB 410, the app DB 420, and the calculation result DB 430 are realized specifically, for example, by the storage device 202 shown in FIG. 2 or the storage device 202 of another computer which the service provider server 101 can access.

The management DB 410 stores a common key and selection information for each IoT device 102. The common key is information that is owned by the service provider server 101 and the IoT device 102 and is used to encrypt or decode data. The common key is generated by the IoT device 102 for each IoT device 102 and is transmitted to the service provider server 101 in accordance with a public key encryption scheme.

The selection information is information for selecting a type of data collected from the sensor/actuator 304. The selection information depends on the first app 111 performed by the IoT device 102. For example, the selection information of a certain IoT device 102 includes information for selecting (or not selecting) image data from a camera.

The connected-device management unit 401 manages the IoT device 102 which is a connected device. Specifically, for example, the connected-device management unit 401 can access the management DB 410 and acquires the common key from the IoT device 102. The connected-device management unit 401 sets the selection information in the first app 111 for each IoT device 102 and transmits the selection information to the IoT device 102, and associates the selection information in the management DB 410 with the common key. The connected-device management unit 401 may perform encryption communication such as secure sockets layer (SSL)/transport layer security (TLS) with the IoT device 102 via the communication unit 400.

The app DB 420 stores the first app 111 and the second app 112. The first app 111 may be the same execution content for all the IoT devices 102 or may be different execution content for each IoT device 102.

The app management unit 402 manages the first app 111 and the second app 112. Specifically, for example, the app management unit 402 reads the first app 111 for each IoT device 102 from the app DB 420 and delivers the first app 111 to the connected-device management unit 401 in response to a request from the connected-device management unit 401.

The calculation result DB 430 stores a calculation result obtained by the data calculation unit 403. The data calculation unit 403 inputs the first data 121 calculated by the first app 111 to the IoT device 102, calculates the second data 122, and stores the second data 122 as a calculation result in the calculation result DB 430.

<Functional Configuration Example of IoT Device 102>

Figure 5:
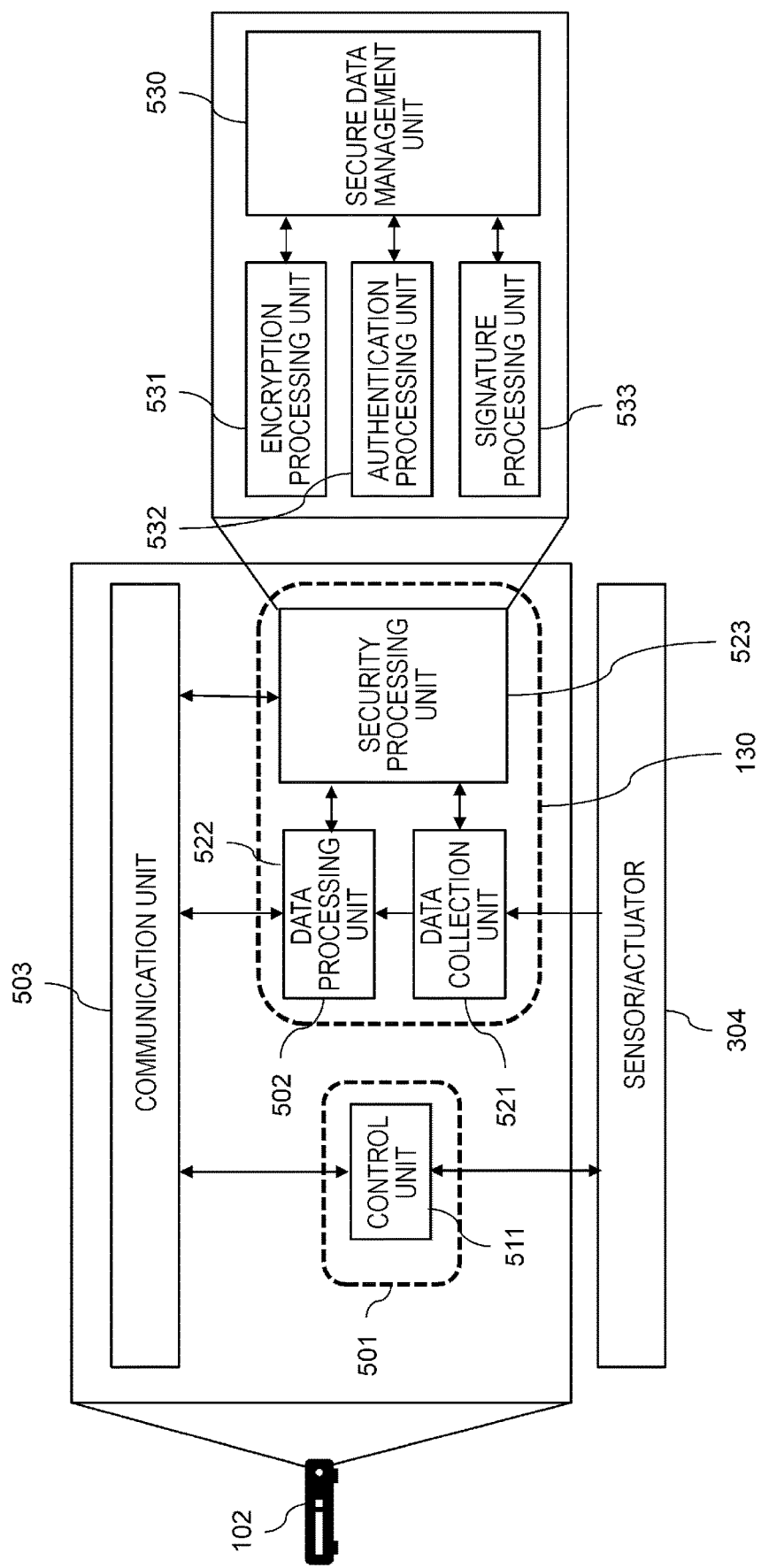
FIG. 5 is a block diagram illustrating a functional configuration example of the IoT device.

FIG. 5 is a block diagram illustrating a functional configuration example of the IoT device 102. The IoT device 102 includes a control unit 511 in the non-secure normal region 501 and includes a data collection unit 521, a data processing unit 522, and a security processing unit 523 in the secure region 130.

The control unit 511 collects and analyzes data from the sensor/actuator 304 connected to the IoT device 102 and performs real-time control of the actuator based on the analysis result. A program realizing the control unit 511 is not basically changed after delivery of the IoT device 102, but only a manager of the IoT device 102 can change processing content by software updating.

In extensive data analysis in which processing performance of the processor 300 is insufficient, the collected data 120 is transmitted to the service provider server 101 via the communication IF 304. In this case, the service provider server 101 may analyze the collected data 120 and perform control such the analysis result is fed back to the IoT device 102 again.

The secure region 130 is managed with a special secure OS different from the normal region 501 and is not accessed directly from the outside or the normal region 501, and thus it is difficult to falsify a program or data. Even when a program on the side of the normal region 501 is hacked or infected by malware, there is a low possibility of the program or the data of the secure region 130 being destroyed.

The secure region 130 includes the data collection unit 521, the data processing unit 522, and the security processing unit 523. The data collection unit 521 acquires the collected data 120 from the sensor/actuator 304 connected to the IoT device 102. Here, the present invention is not limited to the sensor/actuator 304 and data of another device connected in the IoT device 102 may be collected. The data collection unit 521 stores the collected data 120 in the second memory 302. The data collection unit 521 performs only the collection of the collected data 120 and cannot control the sensor/actuator 304.

The data processing unit 522 is realized by a program different from a program implemented in the normal region 501 and is specifically, for example, a function realized by the first app 111 provided from the service provider server 101. The data processing unit 522 performs various kinds of data processing based on the collected data 120 acquired by the data collection unit 521.

The data processing unit 522 may perform, for example, a sensor fusion process of fusing image data from a plurality of cameras in order to improve a function of the IoT device 102 or may perform a failure predictive diagnosis process of an actuator or a monitoring target by a sensor based on state data from the sensor/actuator 304.

Specifically, for example, the data processing unit 522 calculates the first data 121 so that a data amount is less than that of the data collected from the data collection unit 521. Thus, it is possible to reduce a data amount uploaded on the service provider server 101 from the IoT device 102, and thus it is possible to achieve a reduction of a calculation load of the service provider server 101.

The data processing unit 522 calculates the first data 121 which is not reversible data like data compression or encryption but is irreversible in the service provider server 101. Thus, even when the first data 121 is leaked, it is unknown from the outside which meaning the first data 121 has and the first data 121 cannot be returned to the collected data 120. Therefore, it is possible to achieve a reduction in a risk due to leakage.

In this way, even when the first app 111 includes an important algorithm in which AI or know-how is utilized, the algorithm is protected in the secure region 130. Therefore, it is possible to suppress leakage to the outside, falsification, theft, and the like. Here, the data processing unit 522 cannot control the sensor/actuator 304 as in the data collection unit 521.

The data processing unit 522 has a program updating function and can update or erase the first app 111 in response to an instruction from the service provider server 101. The first app 111 is installed or updated in the secure region 130 by the data processing unit 522 in accordance with, for example, a standardized scheme such as the trusted execution environment provisioning (TEEP) protocol which is being examined in Internet Engineering Task Force (IETF).

In the data processing unit 522, the first app 111 may not be implemented in an initial state. The data processing unit 522 may not collect the collected data 120 directly from the sensor/actuator 304 and may use the collected data 120 output selectively from the collected data 120 collected by the data collection unit 521 at a time. In this case, the data collection unit 521 selectively outputs the collected data 120 to the data processing unit 522 in accordance with a setting of a manager of the IoT device 102 or the selection information from the service provider server 101 mutually authenticated by the security processing unit 523.

The security processing unit 523 performs a security process such as digital signature or encryption on the first data 121 transmitted from the data processing unit 522 to the service provider server 101 and a mutual authentication process between the service provider server 101 and the IoT device 102. The security processing unit 523 includes an encryption processing unit 531, an authentication processing unit 532, and a signature processing unit 533. The encryption processing unit 531 encrypts the first data 121 generated by the data processing unit 522.

The authentication processing unit 532 performs a mutual authentication process with the service provider server 101. The signature processing unit 533 performs a signature process on the first data 121 from the data processing unit 522. Secure data such as selection information or a common key of the IoT device 102 necessary for the encryption processing unit 531, the authentication processing unit 532, and the signature processing unit 533 is stored in the second memory 302 which is the secure region 130.

The secure data management unit 530 has a physically tamper-resistant function of forcibly removing content when an illegal access from the outside or a physical attack is confirmed. The present invention is not limited to the configuration of the security processing unit 523 implemented in the secure region 130. The security processing unit 523 may be configured as a device inside the secure region 130 different from the processor 300 such as a hardware security module or a secure element that has physically tamper resistance.

The IoT device 102 includes a communication unit 503. The communication unit 503 receives various kinds of data such as the first app 111 from the service provider server 101 or transmits various kinds of data such as the first data 121 to the service provider server 101 via the communication IF 304.

<Edge Computing Sequence>

Figure 6:
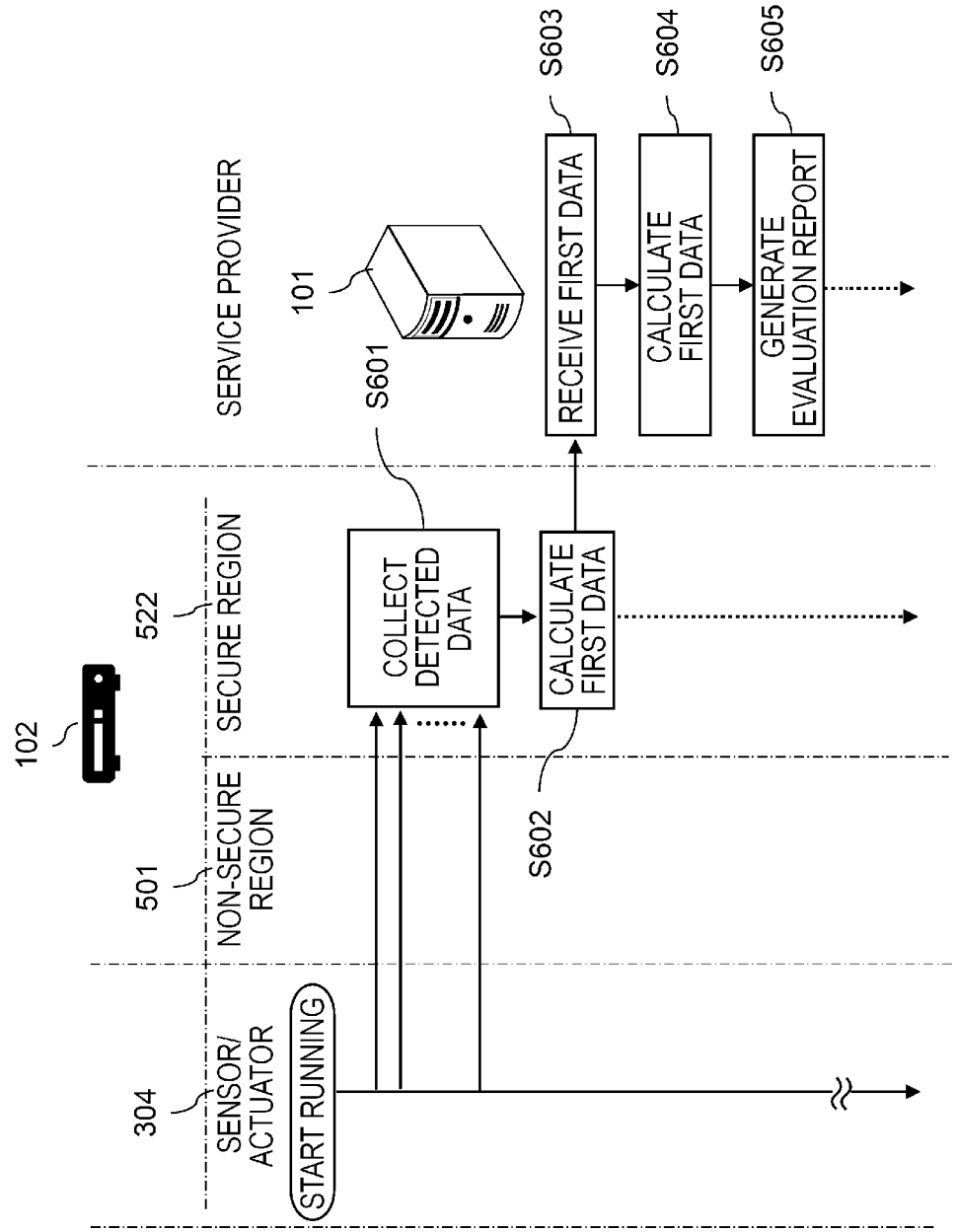
FIG. 6 is a sequence diagram illustrating an edge computing sequence example of the edge computing system according to Embodiment 1.

FIG. 6 is a sequence diagram illustrating an edge computing sequence example of the edge computing system 100 according to Embodiment 1. In the IoT device 102, the first app 111 is installed in the secure region 130 and the first app 111 can be implemented by the data processing unit 522.

When running of the IoT device 102 starts, the data collection unit 521 collects data from the sensor/actuator 304 in the secure region 130 (step S601). The data processing unit 522 calculates the first data 121 based on the collected data 120 collected by the data collection unit 521 in the secure region 130 (step S601). The first data 121 is transmitted to the service provider server 101 by the communication unit 503.

The service provider server 101 receives the first data 121 from the IoT device 102 through the communication unit 503 (step S603) and the data calculation unit 403 calculates the second data 122 based on the first data 121 (step S604). Then, the service provider server 101 generates an evaluation report using the second data 122 (step S605). The evaluation report is, for example, data which is used for the service provider using the service provider server 101 to provide a service to a user of the IoT device 102.

In this way, according to Embodiment 1, each IoT device 102 transmits the first data 121 which has a reduced data amount instead of the collected data 120 to the service provider server 101. Therefore, it is possible to achieve a reduction in the transmission data amount.

Since the first app 111, the collected data 120, and the first data 121 are managed in the secure region 130, it is difficult for a third party or a user of the IoT device 102 to falsify the first app 111, the collected data 120, and the first data 121, and thus it is possible to achieve an improvement in safety. The first data 121 is not reversible data which can be returned to the original collected data 120 such as compression or encryption but irreversible data and it cannot be understood from the outside which meaning the first data 121 has. Accordingly, even when the first data 121 is leaked, no problem occurs.

The service provider server 101 does not calculate the first data 121 and calculates the second data 122 from the collected data 120 of each IoT device 102. Therefore, it is possible to achieve a reduction in a processing load of the service provider server 101.

Embodiment 2

Embodiment 2 will be described. Embodiment 2 is an example in which the service provider entrusts management of the IoT device 102 to a data management service provider when the number of IoT devices 102 increases. Specifically, for example, a computer (a data management server) run by the data management service provider performs data communication with the IoT device 102 in place of the service provider server 101 run by the service provider. In Embodiment 2, differences from Embodiment 1 will be mainly described. Therefore, the same reference numerals are given to the same configurations as those of Embodiment 1 and description thereof will be omitted.

<Running Example of Edge Computing System 100>

Figure 7:
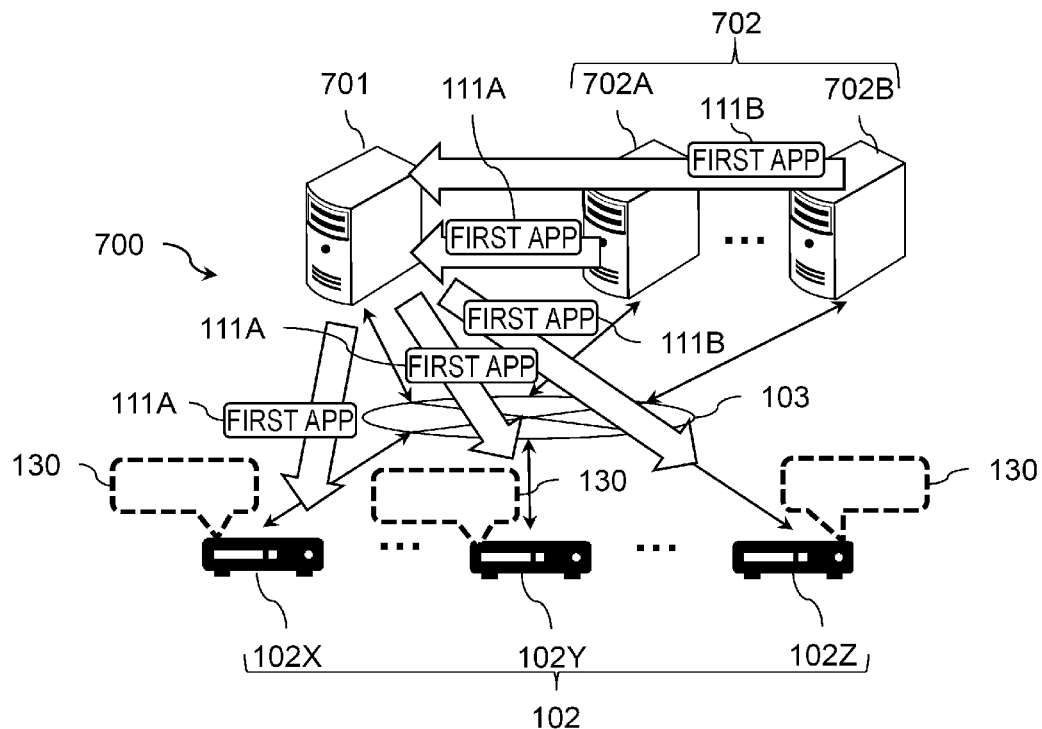
FIG. 7 is a diagram illustrating running example 1 of an edge computing system according to Embodiment 2.

FIG. 7 is a diagram illustrating running example 1 of the edge computing system 100 according to Embodiment 2. FIG. 7 illustrates a running example when the service provider entrusts transmission of the first app 111 to the IoT device 102 to a data management service provider.

In FIG. 7, the edge computing system 100 includes a data management server 701, a service provider server 702, and the IoT device 102. The data management server 701, the service provider server 702, and the IoT device 102 are connected to be able to communicate via the network 103. The service provider server 702 is, for example, a computer run by the service provider providing a service to the user of the IoT device 102. The data management server 701 is a computer run by a data management service provider receiving a contract of data communication with the IoT device 102 from the service provider.

Service provider servers 702A and 702B include first apps 111A and 111B, respectively. The first app 111 of each service provider server 101 is a unique program of each service provider and a kind of collected data 120 depends on each piece of selection information.

The data management server 701 delivers the first app 111 to the IoT device 102 of the user who makes a contract for providing a service with the service provider. Specifically, for example, the data management server 701 transmits the first app 111A to the IoT devices 102X and 102Y. The data management server 701 transmits the first app 111B to the IoT device 102Z.

Figure 8:
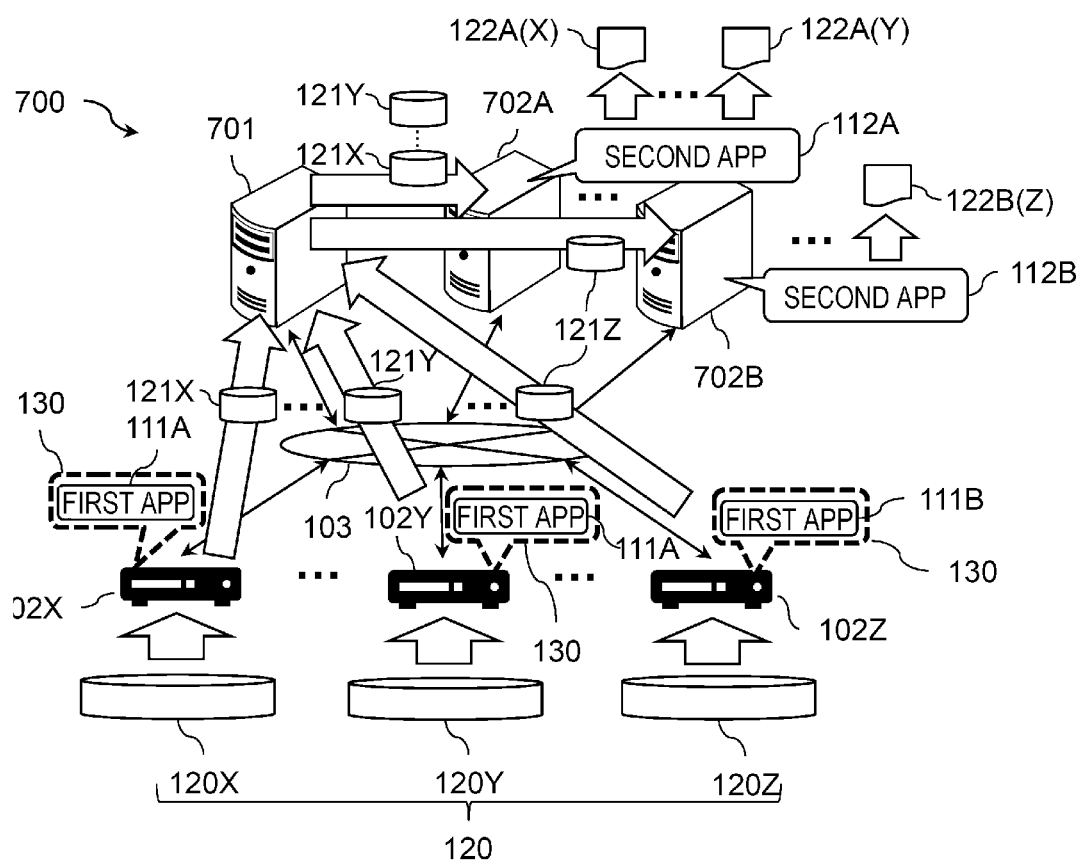
FIG. 8 is a diagram illustrating running example 2 of the edge computing system according to Embodiment 2.

FIG. 8 is a diagram illustrating running example 2 of an edge computing system 100 according to Embodiment 2. FIG. 8 illustrates a running example when the service provider entrusts collection of the first data 121 from the IoT device 102 to a data management service provider.

The IoT devices 102X and 102Y calculate pieces of first data 121X and 121Y according to the first app 111A based on pieces of collected data 120X and 120Y and transmits the pieces of first data 121X and 121Y to the data management server 701. Similarly, the IoT device 102Z calculates first data 121Z according to the first app 111B based on collected data 120Z and transmits the first data 121Z to the data management server 701.

The service provider server 101 acquires the pieces of first data 121X, 121Y, and 121Z from the data management server 701 at a predetermined timing. Then, the service provider server 101 calculates second data 122A (X) for the IoT device 102X and calculates second data 122A(Y) for the IoT device 102Y according to the second app 112A based on the pieces of first data 121X and 121Y. The service provider server 101 calculates second data 122B (Z) for the IoT device 102Z according to the second app 112B based on the first data 121Z.

Thus, the service provider running the service provider server 702A provides a service using the pieces of second data 122A (X) and 122A(Y) to users of the IoT devices 102X and 102Y, respectively. Similarly, the service provider running the service provider server 702B provides a service using second data 122B (Z) to a user of the IoT device 102Z.

<Functional Configuration Example of Server>

Figure 9:
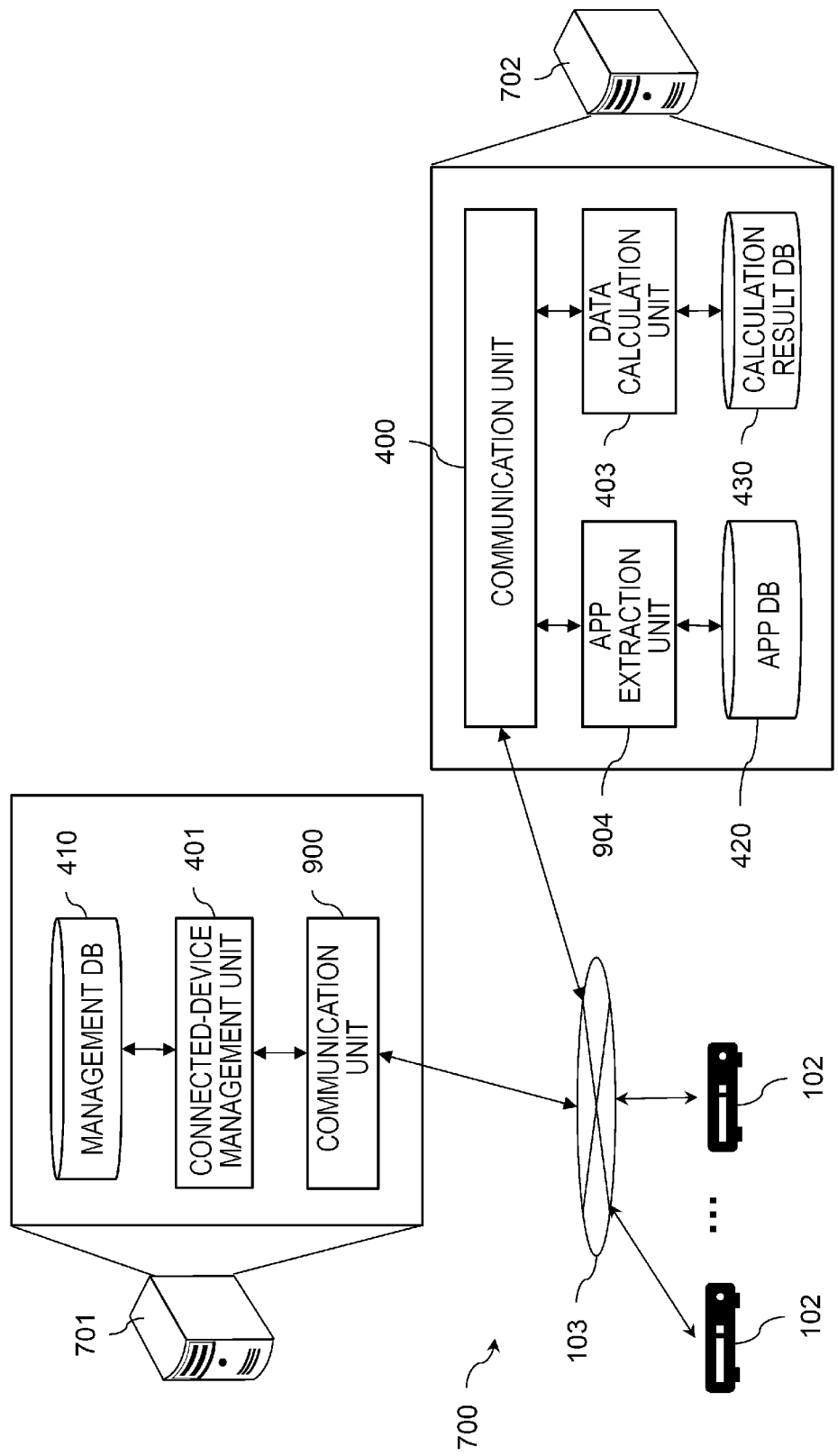
FIG. 9 is a block diagram illustrating a functional configuration example of a server according to Embodiment 2.

FIG. 9 is a block diagram illustrating a functional configuration example of a server according to Embodiment 2. The service provider server 101 includes an app extraction unit 904 in addition to the communication unit 400, the data calculation unit 403, the app DB 420, and the calculation result DB 430. The app extraction unit 904 extracts the first app 111 from the app DB 420. Thus, the communication unit 400 transmits the extracted first app 111 to the data management server 701. Specifically, the app extraction unit 904 and the communication unit 400 are realized, for example, by causing the processor 201 to execute a program stored in the storage device 202 illustrated in FIG. 2.

The data management server 701 includes a communication unit 900 in addition to the connected-device management unit 401 and the management DB 410. The communication unit 900 delivers the first app 111 and the selection information to the IoT device 102 or collects the first data 121 from the IoT device 102. Specifically, the communication unit 900 is realized, for example, by causing the processor 201 to execute a program stored in the storage device 202 illustrated in FIG. 2.

The connected-device management unit 401 stores the first app 111 transmitted from the service provider server 101 in the management DB 410 in association with the common key and the selection information. The connected-device management unit 401 extracts the first data 121 stored in the management DB 410. The communication unit 900 transmits the extracted first data 121 to the service provider server 101.

<Edge Computing Sequence>

Figure 10:
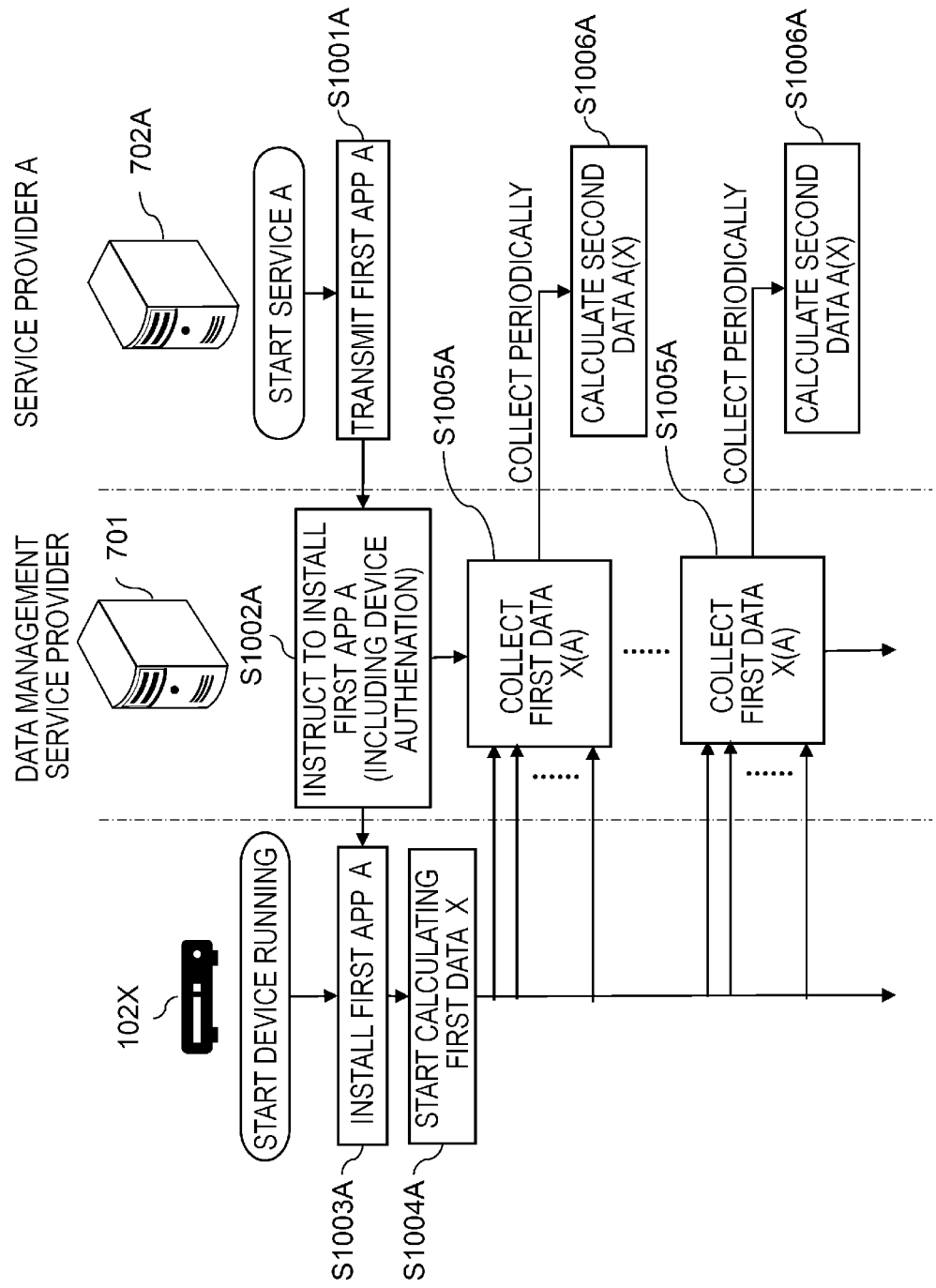
FIG. 10 is a sequence diagram illustrating edge computing sequence example 1 of the edge computing system according to Embodiment 2.

FIG. 10 is a sequence diagram illustrating edge computing sequence example 1 of the edge computing system 100 according to Embodiment 2. In FIG. 10, the service provider server 702A run by a service provider A, the data management server 701, and the IoT device 102X will be exemplified in description.

When a service A in the service provider server 702A starts, the service provider server 101 transmits the first app 111A related to the service A to the data management server 701 (step S1001A). The data management server 701 delivers the first app 111A to the IoT device 102X which is a service target of the service provider A and gives an instruction to install the first app 111A (step S1002A). In step S1002A, a device authentication of the IoT device 102X is also performed. In the device authentication, the common key used for encryption communication with the data management server 701 and the selection information of the first app 111 set by the service provider server 702A are stored in the secure region 130 of the IoT device 102X.

The IoT device 102X installs the first app 111A in the secure region 130 (step S1003A) and starts calculating the first data 121 (hereinafter referred to as X(A)) based on the specific collected data 120 selected in accordance with the selection information (step S1004A). The data management server 701 repeats collection of the first data X(A) (step S1005A). The service provider server 702A periodically collects the first data X(A) collected by the data management server 701 and calculates the second data 122 (referred to as A(X)) according to the second app 112A for the service A (step S1006A).

In this way, the service provider A can entrust delivery of the first app 111A to the IoT device 102X and collection of the first data X(A) from the IoT device 102X to a data management service provider. Thus, it is possible to achieve a reduction in a load of the service provider server 702A.

Figure 11:
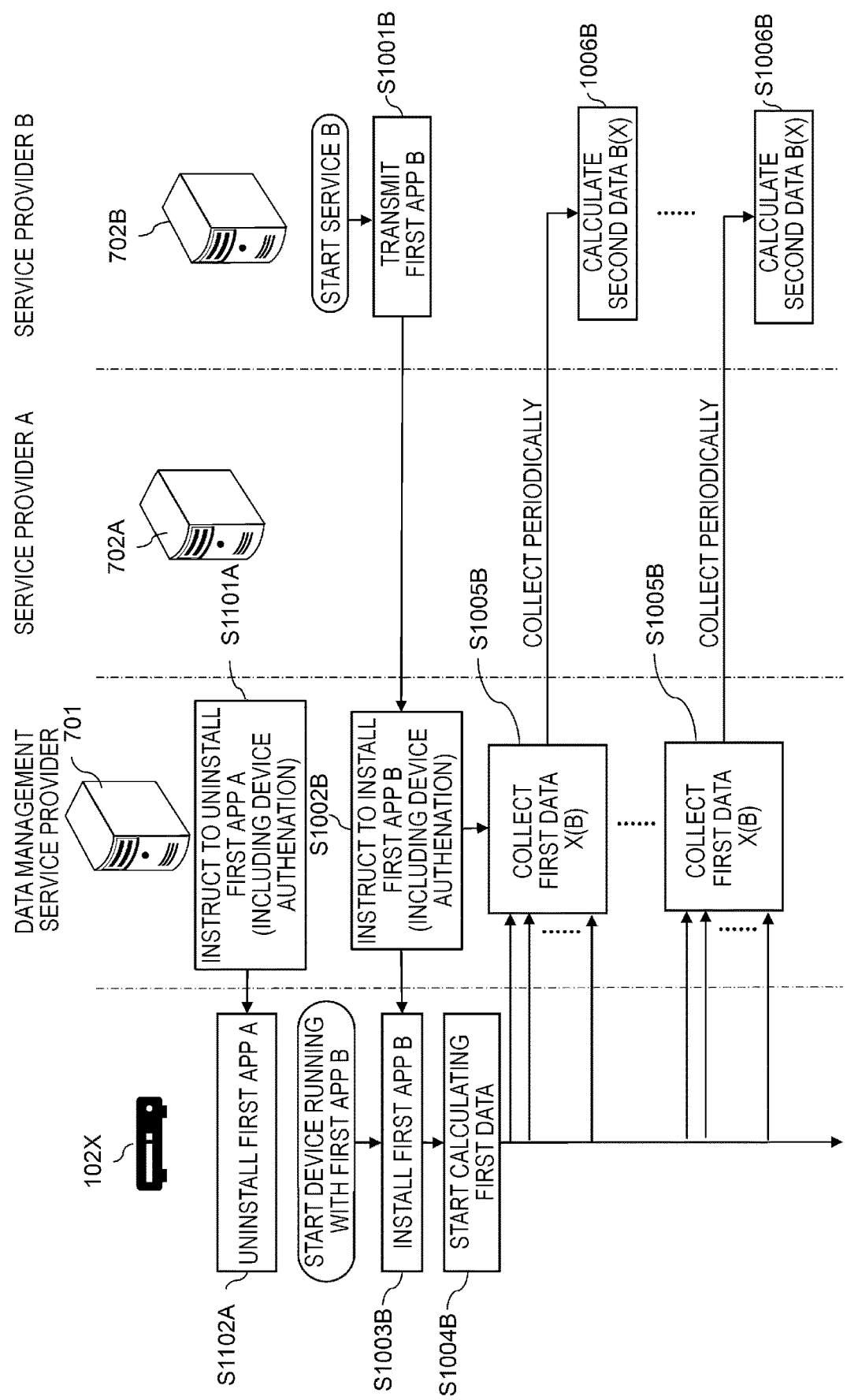
FIG. 11 is a sequence diagram illustrating edge computing sequence example 2 of the edge computing system according to Embodiment 2.

FIG. 11 is a sequence diagram illustrating edge computing sequence example 2 of the edge computing system 100 according to Embodiment 2. FIG. 11 illustrates an example in which a user of the IoT device 102X changes the service provider of the service received with the IoT device 102X from the service provider A providing the service A to the service provider B providing a service B. Before execution of FIG. 11, the user of the IoT device 102X is assumed to make a contract for the service A with the service provider A.

The data management server 701 instructs the IoT device 102X which is a service target of the service provider A to uninstall the first app 111A (step S1101A). In step S1101A, device authentication of the IoT device 102X is also performed. The IoT device 102X uninstalls the first app 111A from the secure region 130 (step S1102A). In the un-installation, the common key used for the encryption communication with the data management server 701 and the selection information of the first app 111A set by the service provider server 702A are also deleted from the secure region 130.

Thereafter, when the service B starts in the service provider server 702B of a service switching destination, the service provider server 101 transmits the first app 111B for the service B to the data management server 701 (step S1001B). The first app 111B is an app that performs calculation different from that of the first app 111A.

The data management server 701 delivers the first app 111B to the IoT device 102X which is a service target of the service provider B and gives an instruction to install the first app 111B (step S1002B). In step S1002B, device authentication of the IoT device 102X is also performed. In the device authentication, the common key used for encryption communication with the data management server 701 and the selection information of the first app 111B set by the service provider server 702B are stored in the IoT device 102X.

The IoT device 102X installs the first app 111B in the secure region 130 (step S1003B) and starts calculating the first data 121 (hereinafter referred to as X(B)) based on the specific collected data 120 selected according to the selection information (step S1004B). The data management server 701 repeats the collection of the first data X(B) (step S1005B). The service provider server 101 periodically collects the first data X(B) collected by the data management server 701 and calculates the second data 122 (referred to as B(X)) according to the second app 122B (step S1006B).

In this way, the data management server 701 can smoothly perform switching of the services A and B applied to the IoT device 102X.

In the foregoing description of Embodiment 2, the data management server 701 run by the data management service provider delivers the first app 111 by proxy, but the following running may be added. For example, in the IoT device 102, an app for transmitting data measured by the IoT device 102 to the data management server 701 is implemented in the secure region 522. The data management server 701 run by the data management service provider collects data measured by each IoT device 102 and performs predetermined analysis. The data management server 701 grants the analysis result to the first data 121 and transmits the first data 121 to the service provider server 702. Thus, the data management service provider can provide the value-added analysis result to the service provider along with the first data 121.

Embodiment 3

Embodiment 3 is an example in which the edge computing system 100 according to Embodiment 1 is applied to telematics car insurance. The telematic car insurance is a car insurance product in which driving data such as driving characteristics (sudden start, overspeed, sudden braking, and the like) in addition to a traveling distance or a driving frequency of a car driven by an insurance contractor is acquired and analyzed as the collected data 120 (hereinafter referred to as driving data 120) to calculate insurance fee data called an insurance rate or an insurance fee.

For the telematics car insurance, the IoT device 102 is implemented in a vehicle of the insurance contractor (hereinafter referred to as a contract vehicle) and the service provider server 101 is run by an insurance service provider (a car insurance company) providing car insurance products. When the number of contract vehicles increases, a data amount of driving data collected from the contract vehicles becomes enormous and communication cost between the IoT devices 102 and the service provider server 101 or analysis cost of the driving data 120 in the service provider server 101 increases. In the IoT device 102 implemented in the contract vehicle or a communication path between the IoT device 102 and the service provider server 101, there is a possibility of the driving data being falsified.

Accordingly, in Embodiment 3, by applying the edge computing system 100 according to Embodiment 1 to the telematics car insurance, it is possible to reduce a data amount of driving data 120 which is collected by the insurance service provider providing a telematics insurance and achieve prevention of falsification of the driving data 120. In Embodiment 3, differences from Embodiment 1 will be mainly described. Therefore, the same reference numerals are given to the same configurations as those of Embodiment 1 and description thereof will be omitted.

When the edge computing system 100 illustrated in FIG. 1 is applied to the telematics car insurance, the IoT device 102 is an electronic control unit (ECU) or a gateway mounted in a contract vehicle. In the sensor/actuator 304, the sensor is, for example, a positioning device that positions a present location according to signals from global positioning system (GPS) satellites, a camera, a vehicle-speed sensor, an acceleration sensor, a rain sensor, or a torque sensor. The actuator is, for example, a brake actuator, a power steering device, or a wiper motor.

The app 110 is a calculation program that calculates insurance fee data such as an insurance fee or an insurance fee rate. The first app 111 is an intermediate program that calculates intermediate data indicating an evaluation value necessary to calculate insurance fee data in the calculation program based on the driving data 120. The second app 112 is a calculation program that calculates insurance fee data based on the intermediate data.

The secure region 130 in which the first app 111 is executed is isolated in the IoT device 102 at a hardware level according to the TEE technology, and thus the degree of security is high. Therefore, the first app 111 which is confidential information and intermediate data which is the calculation result can be protected against theft or falsification. Since the second app 112 is not existed in the IoT device 102, it is unknown how an insurance fee is calculated from the intermediate data despite referring to the intermediate data.

<Intermediate Data>

Figure 12:
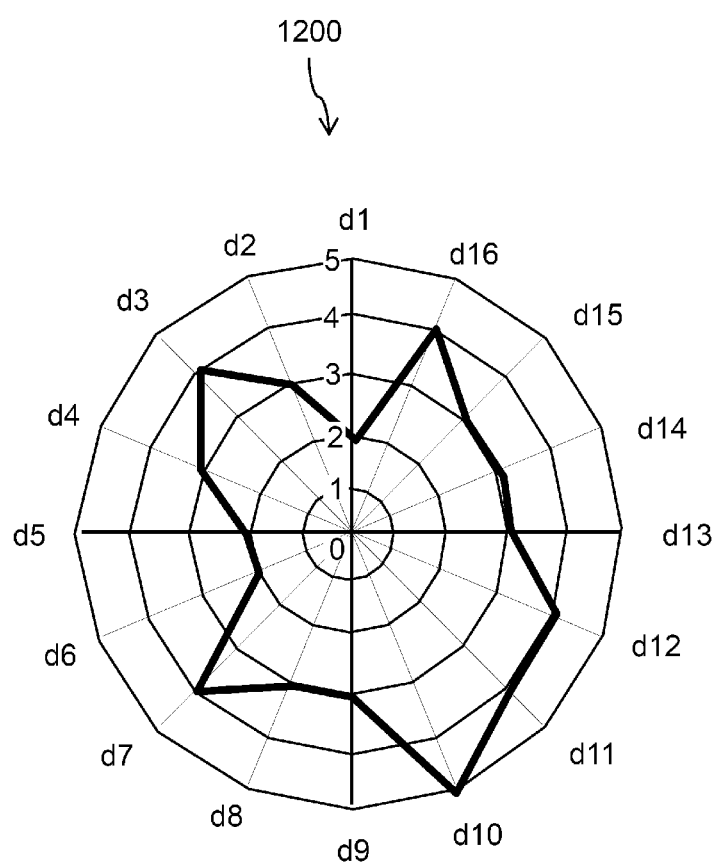
FIG. 12 is a diagram illustrating an example of intermediate data.

FIG. 12 is a diagram illustrating an example of intermediate data 1200. The intermediate data 1200 illustrated in FIG. 12 is, for example, a set of sixteen kinds of data d1 to d16 evaluated at six stages (0 to 5). The kinds of data d1 to d16 include, for example, evaluation values of a driving time of a contract vehicle, a driving time per time, a driving frequency, a traveling distance, an average speed, a highest speed, a sudden action (sudden acceleration, sudden steering, or sudden braking), a speed exceeding a legal speed limit, and drowsing. The intermediate data 1200 is calculated at a predetermined timing (for example, a reference date of insurance fee calculation) with respect to the driving data 120 within a predetermined period and is uploaded to the service provider server 101.

<Edge Computing Sequence>

Figure 13:
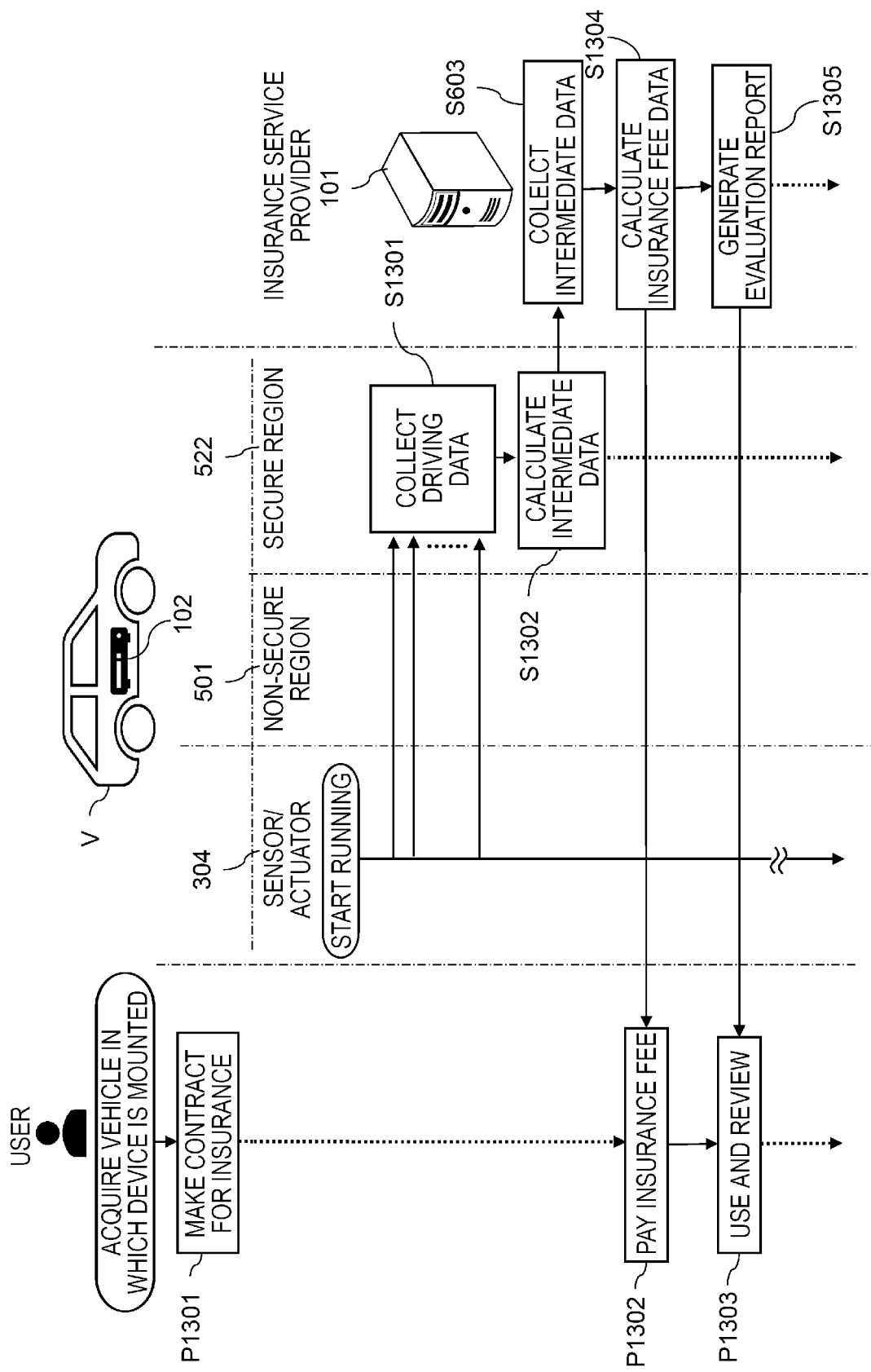
FIG. 13 is a sequence diagram illustrating an insurance fee calculation sequence example of the edge computing system according to Embodiment 2.

FIG. 13 is a sequence diagram illustrating an insurance fee calculation sequence example of the edge computing system 100 according to Embodiment 2. A user who is an insurance contractor is assumed to acquire (rent despite buying) a vehicle V in which the IoT device 102 is mounted. In the IoT device 102, it is assumed that the first app 111 is installed in the secure region 130 and the data processing unit 522 can execute the first app 111.

The user makes a contract for a telematics car insurance with an insurance service provider running the service provider server 101 (process P1301). Thereafter, when the user drives the vehicle V, the running of the IoT device 102 starts. When the running of the IoT device 102 starts, the data collection unit 521 collects the driving data 120 from the sensor/actuator 304 in the secure region 130 (step S1301).

The data processing unit 522 calculates the intermediate data 1200 based on the driving data 120 collected by the data collection unit 521 in the secure region 130 (step S1302). The intermediate data 1200 is transmitted to the service provider server 101 by the communication unit 503.

In the service provider server 101, the communication unit 503 receives the intermediate data 1200 from the IoT device 102 (step S1303) and the data calculation unit 403 calculates insurance fee data based on the intermediate data 1200 (step S1304). The user pays an insurance fee through, for example, automatic withdrawal from a banking account of the user (process P1302). The service provider server 101 generates an evaluation report including the calculated insurance fee data (step S1305). The evaluation report is sent to the user by an electronic or paper medium.

In this way, according to Embodiment 3, each IoT device 102 transmits the intermediate data 1200 of which a data amount is reduced instead of the driving data 120 to the service provider server 101. Therefore, it is possible to achieve a reduction in the data amount to be transmitted.

Since the first app 111, the driving data 120, and the intermediate data 1200 are managed in the secure region 130, it is difficult for a third party or a user of the IoT device 102 to falsify the first app 111, the collected data 120, and the intermediate data 1200, and thus it is possible to achieve an improvement in safety. The intermediate data 1200 is not reversible data which can be returned to the original collected data 120 such as compression or encryption but irreversible data and it cannot be understood from the outside which meaning the first data 121 has. Accordingly, even when the intermediate data 1200 is leaked, no problem occurs.

The service provider server 101 does not calculate the intermediate data 1200 and calculates the insurance fee data from the driving data 120 of each IoT device 102. Therefore, it is possible to achieve a reduction in a processing load of the service provider server 101.

Embodiment 4

Embodiment 4 is an example in which the edge computing system 100 according to Embodiment 2 is applied to telematics car insurance as in Embodiment 3. For the telematics car insurance, the IoT device 102 is implemented in the vehicle V of an insurance contractor, the service provider server 101 is run by an insurance service provider (a car insurance company) providing car insurance products, and the data management server 701 is run by a data management service provider to which a plurality of insurance service providers entrust management of the IoT devices 102 and collection work of the intermediate data 1200. In Embodiment 4, differences from Embodiments 2 and 3 will be mainly described. Therefore, the same reference numerals are given to the same configurations as those of Embodiments 2 and 3 (including Embodiment 1) and description thereof will be omitted.

<Edge Computing Sequence>

Figure 14:
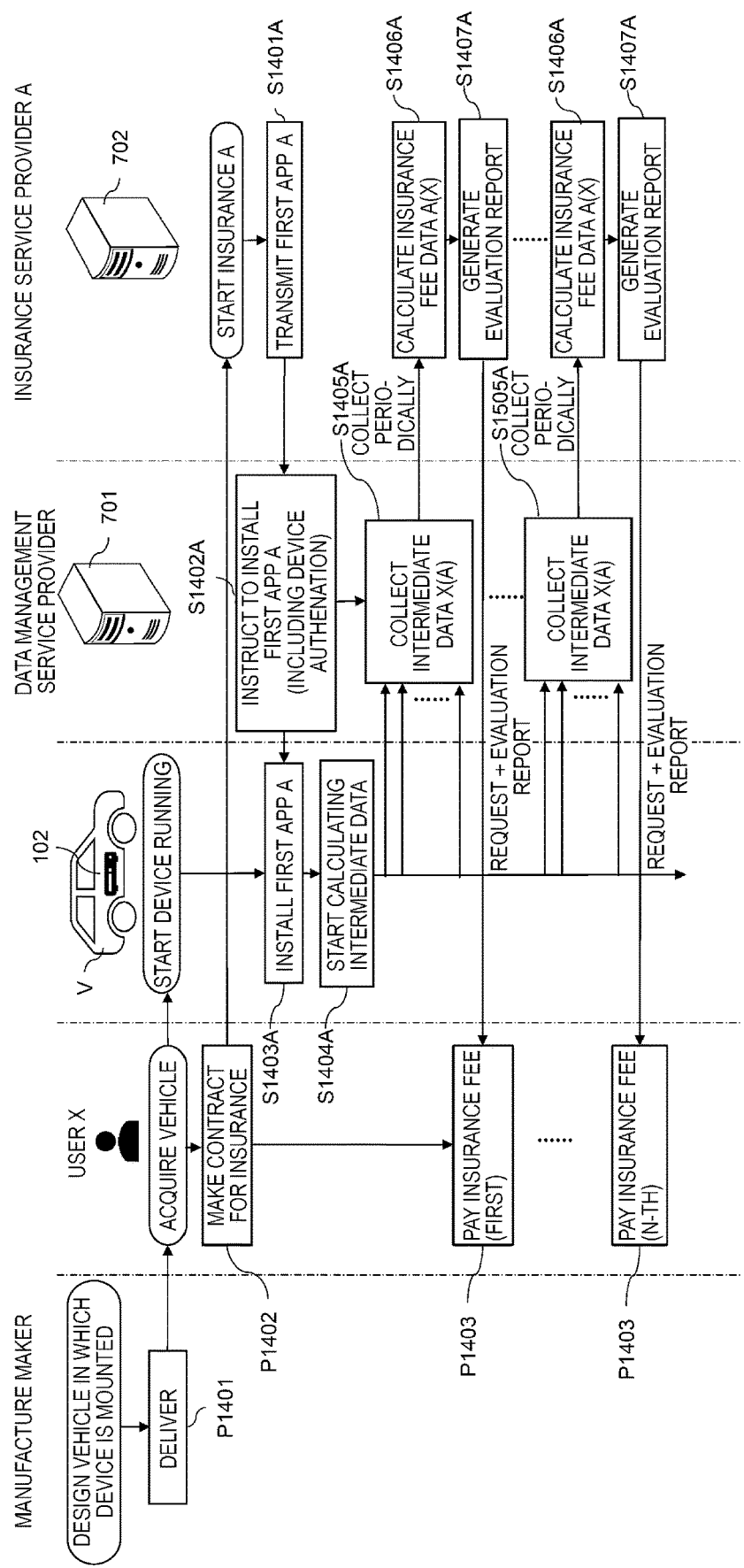
FIG. 14 is a sequence diagram illustrating insurance fee calculation sequence example 1 of an edge computing system according to Embodiment 4.

FIG. 14 is a sequence diagram illustrating insurance fee calculation sequence example 1 of the edge computing system 100 according to Embodiment 4. In FIG. 14, the service provider server 702A run by the insurance service provider A, the data management server 701, and the IoT device 102X used by a user X will be exemplified in description.

A manufacture maker designs and delivers the vehicle V in which the IoT device 102X is mounted (process P1401). After the user X acquires (rents despite buying) the vehicle V, the user X makes a contract for telematics car insurance with the insurance service provider A running the service provider server 702A (process P1402). Thereafter, when the user X drives the vehicle V, the running of the IoT device 102X starts.

When a service of the telematics car insurance A starts in the service provider server 702A, the service provider server 101 transmits the first app 111A related to the telematics car insurance A to the data management server 701 (step S1401A). The data management server 701 delivers the first app 111A to the IoT device 102X which is an insurance service target of the service provider A and gives an instruction to install the first app 111A (step S1402A). In step S1402A, device authentication of the IoT device 102 is also performed. In the device authentication, the common key used for encryption communication with the data management server 701 and the selection information of the first app 111 set by the service provider server 702A are stored in the secure region 130 of the IoT device 102X.

The IoT device 102X installs the first app 111A in the secure region 130 (step S1403A) and starts calculating the intermediate data 1200 (hereinafter referred to as X(A)) based on the specific driving data 120 selected according to the selection information (step S1404A). The data management server 701 repeats the collection of the intermediate data X(A) (step S1405A). The service provider server 101 periodically collects the intermediate data X(A) collected by the data management server 701, calculates the insurance fee data A(X) according to the second app 112A (step S1406A), and generates an evaluation report (step S1407A). An insurance fee is asked to the user by the insurance service provider and the evaluation report is sent from the insurance service provider to the user.

In this way, the insurance service provider can entrust delivery of the first app 111 to the IoT device 102 and collection of the intermediate data X(A) from the IoT device 102 to a data management service provider. Thus, it is possible to achieve a reduction in a load of the service provider server 101.

Figure 15:
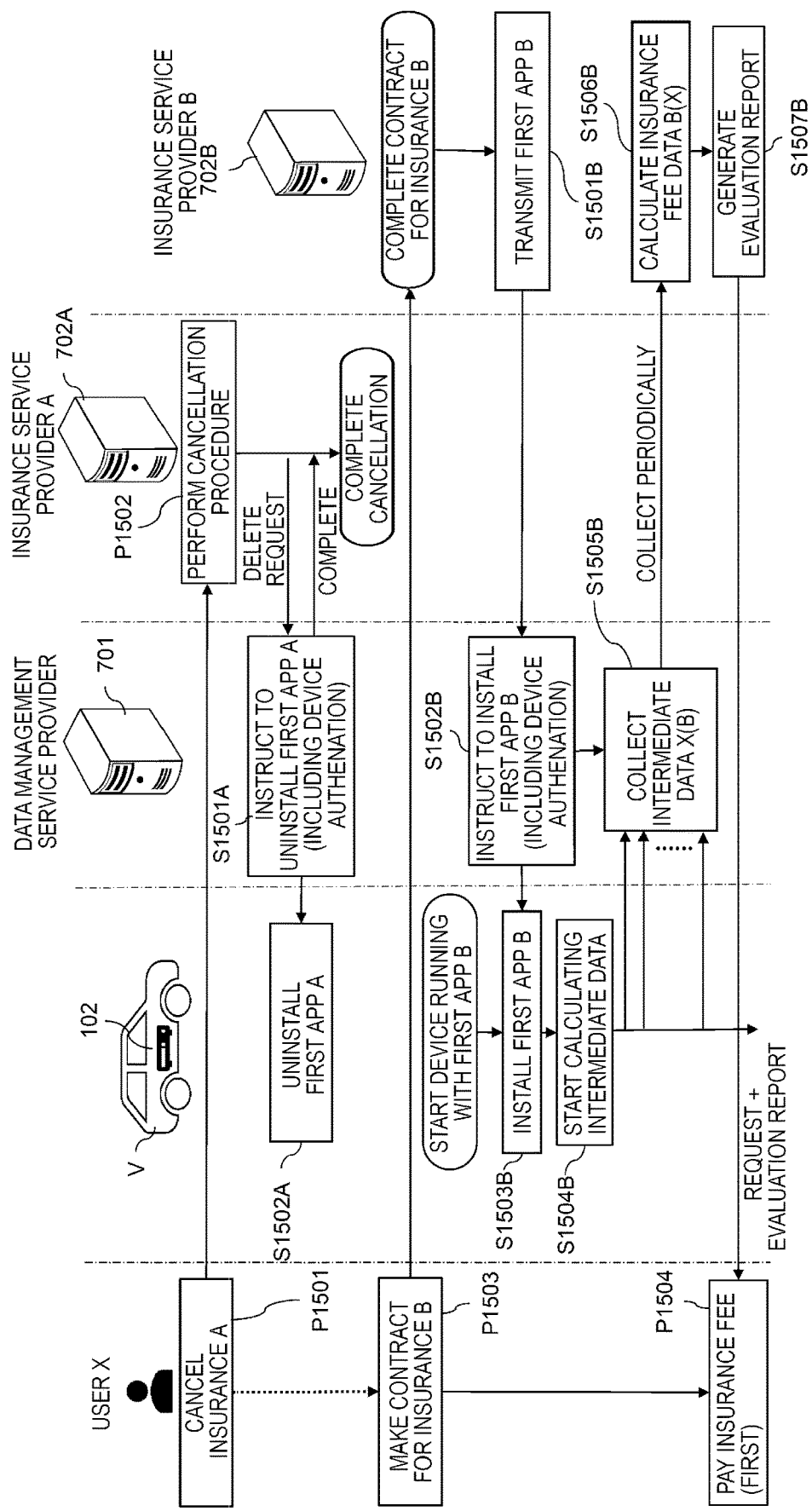
FIG. 15 is a sequence diagram illustrating insurance fee calculation sequence example 2 of the edge computing system according to Embodiment 4.

FIG. 15 is a sequence diagram illustrating insurance fee calculation sequence example 2 of the edge computing system 100 according to Embodiment 4. FIG. 15 illustrates an example in which the user X of the IoT device 102X changes the insurance service provider providing the telematics car insurance received with the IoT device 102X from the insurance service provider A to the insurance service provider B. Before execution of FIG. 15, the user X of the IoT device 102X is assumed to make a contract for the telematics car insurance A with the service provider A.

The user X cancels the telematics car insurance A of the insurance service provider A running the service provider server 702A (process P1501). The insurance service provider A performs a cancellation procedure of the telematics car insurance A (process P1502). The data management server 701 receives a request for deleting the first app 111A which is a cancellation target from the service provider server 702A and instructs the IoT device 102X of the user to uninstall the first app 111A (step S1501A).

In step S1501A, device authentication of the IoT device 102X is also performed. The IoT device 102X uninstalls the first app 111A from the secure region 130 (step S1502A). In the un-installation, the common key used for the encryption communication with the data management server 701 and the selection information of the first app 111A set by the service provider server 702A are also deleted from the secure region 130. Thus, the cancellation procedure of the telematics car insurance A is completed.

Thereafter, the user X performs a contract procedure for the telematics car insurance B of the insurance service provider B running the service provider server 702B and completes the contraction for the telematics car insurance B (process P1503). In this case, when the service of the telematics car insurance B starts in the service provider server 702B of an insurance service switching destination, the service provider server 702B transmits the first app 111B for the telematics car insurance B to the data management server 701 (step S1501B). The first app 111B is an app that performs calculation different from that of the first app 111A.

The data management server 701 delivers the first app 111B to the IoT device 102X which is an insurance service target of the insurance service provider B and gives an instruction to install the first app 111B (step S1502B). In step S1502B, device authentication of the IoT device 102X is also performed. In the device authentication, the common key used for encryption communication with the data management server 701 and the selection information of the first app 111B set by the service provider server 702B are stored in the IoT device 102X.

The IoT device 102X installs the first app 111B in the secure region 130 (step S1503B) and starts calculating the intermediate data 1200 (hereinafter referred to as X(B)) (step S1504B). The data management server 701 repeats the collection of the intermediate data X(B) (step S1505B). The service provider server 101 periodically collects the intermediate data X(B) collected by the data management server 701, calculates the insurance fee data B(X) according to the second app 112B (step S1506B), and generates an evaluation report (step S1507B). An insurance fee is asked to the user X by the insurance service provider B and the evaluation report is sent from the insurance service provider B to the user X.

In this way, the data management server 701 can smoothly perform switching of the insurance services applied to the IoT device 102.

In the foregoing description of Embodiment 4, the data management server 701 run by the data management service provider delivers the first app 111 by proxy, but the following running may be added. For example, the data management service provider is also a company that performs monitoring and maintenance of the vehicle V. In the IoT device 102, an app for transmitting state data (which is different from the driving data 120) of the vehicle V measured by the IoT device 102 to the data management server 701 is implemented in the secure region 522. The data management server 701 run by the data management service provider collects the state data of the vehicle V measured by each IoT device 102 from each IoT device 102 and performs analysis related to an abnormality frequency or failure prediction according to the vehicle V. The analysis result is data that is valid also for calculation of an insurance fee by the insurance service provider. The data management server 701 grants the analysis result to the first data 121 and transmits the first data 121 to the service provider server 702. Thus, the data management service provider can provide the value-added analysis result to the service provider along with the first data 121.

Embodiment 5

Embodiment 5 is an application example of a telematics insurance in which a GEO-fence is used in Embodiment 3 or 4. In Embodiment 5, differences from Embodiments 3 and 4 will be mainly described. Therefore, the same reference numerals are given to the same configurations as those of Embodiments 3 and 4 and description thereof will be omitted.

Figure 16:
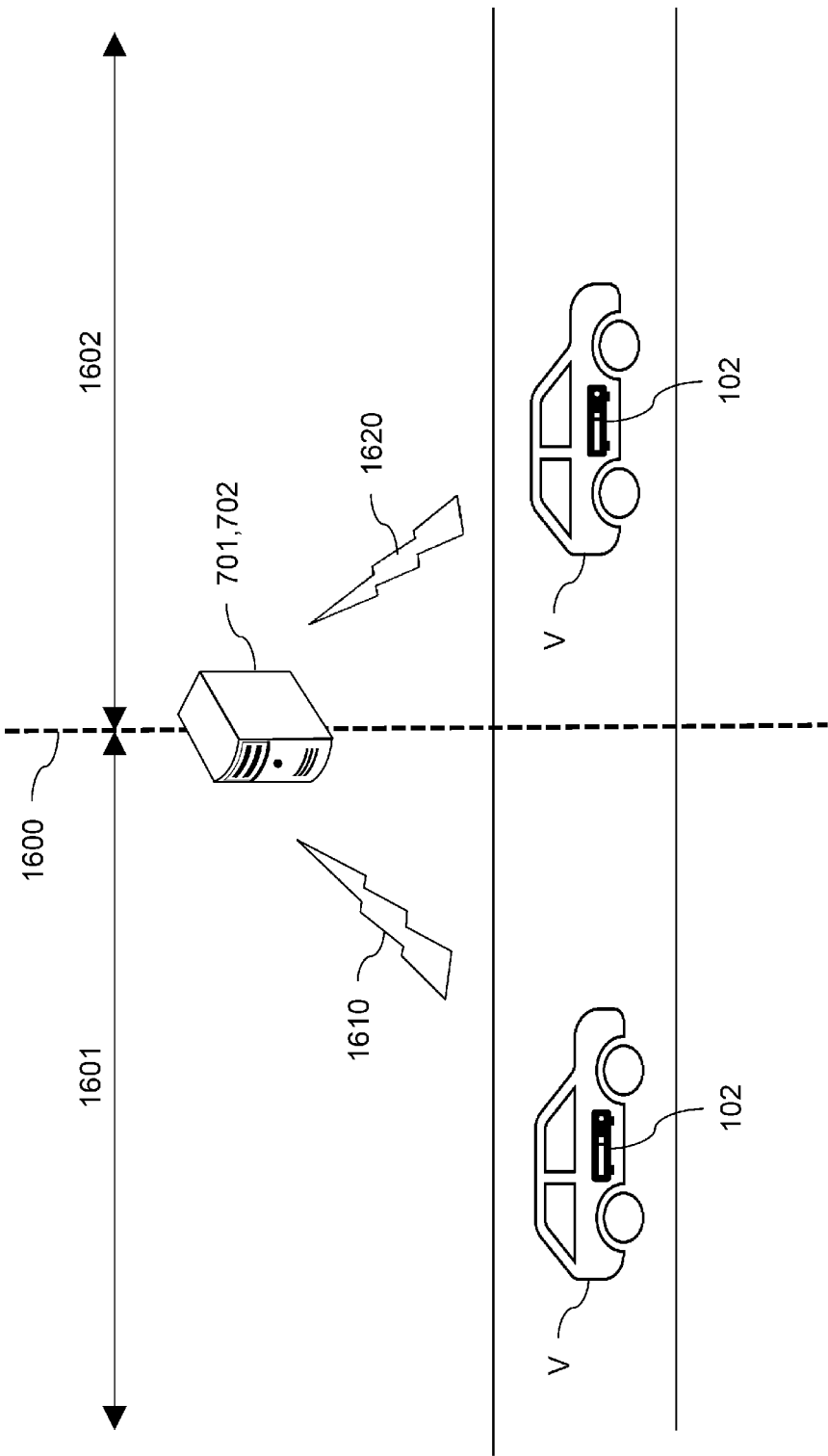
FIG. 16 is a diagram illustrating an application example of a telematics insurance in which a GEO-fence is used.

FIG. 16 is a diagram illustrating an application example of a telematics insurance in which a GEO-fence is used. A GEO-fence 1600 is a virtual geographic boundary line. The GEO-fence 1600 may be, for example, any boundary line for defining a kind of application range of the insurance service or may be a boundary line along a boundary between districts, such as a national border, a state boundary, or a prefectural boundary. A first region 1601 and a second region 1602 are regions adjacent to each other when the GEO-fence 1600 is a boundary line.

The first region 1601 and the second region 1602 differ in a law which is applied or an insurance rule. When the vehicle V is traveling in the first region 1601, the IoT device 102 calculates intermediate data 1610 according to a law or an insurance rule of the first region 1601. When the vehicle V is traveling in the second region 1602, the IoT device 102 calculates intermediate data 1620 according to a law or an insurance rule of the second region 1602.

Here, a case in which an evaluation value related to excess of a legal speed limit is calculated using the GEO fence 1600 as a national border will be described as an example. A legal speed limit of the first region 1601 is assumed to be a speed of 60 [km/h] and a legal speed limit of the second region 1602 is assumed to be a speed of 40 [km/h]. When the vehicle V is traveling in the first region 1601 at the speed of 60 [km/h], the speed does not exceed the legal speed limit.

Thereafter, when the vehicle V passes through the GEO-fence 1600 and moves to the second region 1602 while maintaining the speed of 60 [km/h], the speed exceeds the legal speed limit of the second region 1602 by a speed of 20 [km/h].

In the IoT device 102, a positioning device positions a present location of the vehicle V in accordance with signals from the GPS satellites. When the present position is in the first region 1601, the IoT device 102 sets a parameter (the legal speed limit: a speed of 60 [km/h]) of the first region 1601 as a parameter used for the first app 111 and calculates the intermediate data 1610 including an evaluation value related to excess of the legal speed limit using the driving data 120 acquired during traveling of the first region 1601. Similarly, when the present position is in the second region 1602, the IoT device 102 sets a parameter (the legal speed limit: a speed of 40 [km/h]) of the second region 1602 as a parameter used for the first app 111 and calculates the intermediate data 1620 including an evaluation value related to excess of the legal speed limit using the driving data 120 acquired during traveling of the second region 1602.

In this case, the data management server 701 (when Embodiment 3 is applied) or the service provider server 702 (when Embodiment 4 is applied) sets a parameter of the first region 1601 as a parameter used for the second app 112 and calculates insurance fee data related to an insurance service in the first region 1601 using the intermediate data 1610. Similarly, the data management server 701 (when Embodiment 3 is applied) or the service provider server 702 (when Embodiment 4 is applied) sets a parameter of the second region 1602 as a parameter used for the second app 112 and calculates insurance fee data related to an insurance service in the second region 1602 using the intermediate data 1620. Thus, the service provider server 101 can calculate insurance fee data according to a law or an insurance rule to be applied to the region.

In above-described Embodiment 5, the IoT device 102 detects a region in which the present position of the vehicle V is located and changes the parameter used for the first app 111 to a parameter according to the region. On the other hand, the data management server 701 (when Embodiment 3 is applied) or the service provider server 702 (when Embodiment 4 is applied) may switch the first app 111 for the IoT device 102 rather than changing the parameter.

Specifically, for example, when the present position of the vehicle V is in the first region 1610, the first app 121 that has a parameter appropriate for the first region 1610 is implemented in the secure region 522 of the IoT device 102. When the present position of the vehicle V is in the first region 1620, the IoT device 102 notifies the data management server 701 (when Embodiment 3 is applied) or the service provider server 702 (when Embodiment 4 is applied) that the present position is in the second region 1620.

Then, the data management server 701 (when Embodiment 3 is applied) or the service provider server 702 (when Embodiment 4 is applied) transmits the first app 121 that has a parameter appropriate for the second region 1620 to the IoT device 102. The IoT device 102 overwrites the received first app 121. Thus, the IoT device 102 can calculate the intermediate data 1620 including the evaluation value related to the excess of the legal speed limit using the driving data 120 acquired during driving in the second region 1620 with the parameter of the second region 1620.

In the edge computing system 100 according to above-described Embodiments 1 to 5, the first data 121 is uploaded. Therefore, it is possible to achieve a reduction in the transmission data amount. Since the first app 111 and the first data 121 are managed in the secure region 130, it is difficult for a third party or the user of the IoT device 102 to falsify the first app 111 and the first data 121. Accordingly, it is possible to achieve an improvement in safety.

The first data 121 is not reversible data which can be returned to the original collected data 120 such as compression or encryption but irreversible data. Accordingly, even when the first data 121 is leaked, it is unknown how the first data 121 is used. Since the service provider server 101 does not calculate the first data 121 and calculates the second data 122, it is possible to achieve a reduction in a processing load of the service provider server 101.

The edge computing system 100 according to above-described Embodiments 1 to 5 can be defined as data processing methods of the following (1) to (10).

(1) A data processing method performed by the IoT device 102 acquiring the collected data 120 from a collection target and a first computer capable of communicating with the IoT device 102 includes: a first calculation process of, by the IoT device 102, storing the collected data 120 in the secure region 130 to which referring of internally stored information from outside is not allowable and calculating the first data 121 which has a data amount less than the collected data 120 and is irreversible in the secure region 130 based on the stored collected data 120; a first communication process of, by the IoT device 102, transmitting the first data 121 calculated through the first calculation process to the service provider server 101; and a second calculation process of, by the service provider server 101, calculating second data 122 based on the first data 121 transmitted from the IoT device 102 through the first communication process.

Thus, it is possible to realize a reduction in the communication data amount securely and a reduction in a processing load in the service provider server 101.

(2) In the data processing method according to (1), the IoT device 102 stores selection information for selecting specific collected data 120 used in the first app 111 performing the first calculation process from the collected data 120 in the secure region 130. In the first calculation process, the IoT device 102 acquires only the specific collected data 120 in the collected data 120 to the secure region 130 in accordance with the selection information and calculates the first data 121 which has a data amount less than the specific collected data 120 and is irreversible in the secure region 130 based on the acquired specific collected data 120.

Thus, the collected data can be narrowed down in accordance with the selection information. Since the selection information is stored in the secure region 130, it is unknown from the outside which collected data 120 is narrowed down. Therefore, it is possible to achieve a reduction in a possibility of the first data 121 being decoded.

(3) In the data processing method according to (1), the method further includes a second communication process of, by the data management server 701, transmitting the first data 121 transmitted from the IoT device 102 to the service provider server 702 through the first communication process. In the first communication process, the IoT device 102 transmits the first data 121 to the data management server 701 capable of communicating with the IoT device 102 and the service provider server 101. In the second calculation process, the service provider server 702 calculates the second data 122 based on the first data 121 transmitted from the data management server 701 through the second communication process.

Thus, the data management server 701 collects the first data 121 from the IoT device 102. Therefore, it is possible to achieve a reduction in a processing load of the service provider server 702.

(4) In the data processing method according to (3), the method further includes a setting process of, by the IoT device 102, setting the program to be executable in the secure region 130. In the second communication process, the data management server 701 transmits the first app 111 to the IoT device 102. Thus, the first app 111 can be set securely, and thus it is possible to achieve prevention of falsification of the first app 111 and the first data 121.

(5) In the data processing method according to (4), in the second communication process, the data management server 701 transmits an instruction to delete the first app 111 to the IoT device 102. In the setting process, the IoT device 102 deletes the first app 111 from the secure region 130.

Thus, when an instruction to delete the first app 111 from the data management server 701 is given, it is possible to delete the first app 111 of the secure region 130.

(6) In the data processing method according to (4), the IoT device 102 stores selection information for selecting specific collected data 120 used in the first app 111 from the collected data 120 in the secure region 130. In the first calculation process, the IoT device 102 acquires the specific collected data 120 in the collected data 120 in the secure region 130 in accordance with the selection information and calculates the first data 121 which has a data amount less than the specific collected data 120 and is irreversible based on the acquired specific collected data 120.

Thus, the collected data can be narrowed down in accordance with the selection information. Since the selection information is stored in the secure region 130, it is unknown from the outside which collected data 120 is narrowed down. Therefore, it is possible to achieve a reduction in a possibility of the first data 121 being decoded.

(7) In the data processing method according to (6), in the second communication process, the data management server 701 transmits the selection information to the IoT device 102. In the first calculation process, the IoT device 102 stores the selection information in the secure region 130.

Thus, the collected data can be narrowed down in accordance with the selection information given from the data management server 701. Since the selection information is stored in the secure region 130, it is unknown from the outside which collected data 120 is narrowed down. Therefore, it is possible to achieve a reduction in a possibility of the first data 121 being decoded.

(8) In the data processing method according to (1), the first data 121 is data for evaluating a user of the collection target. The second data 122 is data related to a service applied to the user. Thus, the data processing method can be applied to a service provided to a user.

(9) In the data processing method according to (8), the collection target is a contract vehicle V which the user boards. The first data 121 is the intermediate data 1200 for evaluating driving of the contract vehicle V (driving by a user or automated driving of the contract vehicle V) when the user boards. The second data 122 is data related to an insurance fee applied to the user or an owner of the contract vehicle V.

Thus, the data processing method can be applied to a telematics car insurance service.

(10) In the data processing method according to (3), the first data 121 is data for evaluating a user of the collection target. The second data 122 is data related to a service applied to the user.

Thus, the data processing method can be applied to a service provided to a user.

(11) In the data processing method according to (10), the collection target is the contract vehicle V which the user boards. The first data 121 is the intermediate data 1200 for evaluating driving of the contract vehicle V (driving by a user or automated driving of the contract vehicle V) when the user boards. The second data 122 is insurance fee data applied to the user or the owner of the contract vehicle V.

Thus, the data processing method can be applied to a telematics car insurance service.

(12) In the data processing method according to (9), in the first calculation process, the IoT device 102 stores the collected data 120 in the secure region 130 and positional information of the contract vehicle V upon acquiring the collected data 120 and calculates the first data 121 which has a data amount less than the collected data 120 and is irreversible based on the stored collected data 120. In the first communication process, the IoT device 102 transmits the first data 121 including the positional information to the service provider server 101. The second calculation process is a process in which a method of calculating the second data 122 is different between the first region 1601 and the second region 1602. In the second calculation process, the service provider server 101 calculates the insurance fee data related to the first region 1601 based on the first data 121 including positional information in the first region 1601 and calculates the insurance fee data related to the second region 1602 based on the first data 121 including positional information in the second region 1602.

Thus, the data processing method can be applied to a telematics car insurance service in which a GEO-fence is used.

The present invention is not limited to the above-described embodiments and various modified examples and equivalent configurations are included within the gist of the appended claims. For example, the above-described embodiments have been described in detail to facilitate the description and the present invention is not necessarily limited to all the described configurations. Some of the configurations of a certain embodiment may be substituted with configurations of another embodiment. Configurations of another embodiment may be added to configurations of a certain embodiment. For some of the configurations of each embodiment, other configurations may be added, deleted, or substituted.

Some or all of the above-described configurations, functions, processing units, and processing methods may be realized by hardware, for example, by designing integrated circuits, or may be realized by software by causing a processor to analyze and execute a program that realizes each function.

Information such as a program, a table, or a file for realizing each function can be stored in a storage device such as a memory, a hard disk, or a solid-state drive (SSD) or a recording medium such as an integrated circuit (IC) card, an SD card, a digital versatile disc (DVD).

Control lines or information lines indicate lines considered to be necessarily described, and do not necessarily indicate all the control lines or information lines necessary for implementation. Actually, most all the configurations may be considered to be connected to each other.

What is claimed is:

1. A data processing method performed by an edge device acquiring collected data from a collection target and a first computer capable of communicating with the edge device, the method comprising:
   a first calculation process of, by the edge device, storing the collected data in a secure region to which referring of internally stored information from outside is not allowable and calculating first data which has a data amount less than the collected data and is irreversible in the secure region based on the stored collected data;
   a first communication process of, by the edge device, transmitting the first data calculated through the first calculation process to the first computer; and
   a second calculation process of, by the first computer, calculating second data based on the first data transmitted from the edge device through the first communication process.

2. The data processing method according to claim 1, wherein the edge device stores selection information for selecting specific collected data used in a program performing the first calculation process from the collected data in the secure region, and
   wherein, in the first calculation process, the edge device acquires only the specific collected data in the collected data to the secure region in accordance with the selection information and calculates the first data which has a data amount less than the specific collected data and is irreversible in the secure region based on the acquired specific collected data.

3. The data processing method according to claim 1, comprising:
a second communication process of, by a second computer, transmitting the first data transmitted from the edge device to the first computer through the first communication process,
wherein, in the first communication process, the edge device transmits the first data to the second computer capable of communicating with the edge device and the first computer, and
wherein, in the second calculation process, the first computer calculates the second data based on the first data transmitted from the second computer through the second communication process.

4. The data processing method according to claim 3, comprising:
a setting process of, by the edge device, setting the program to be executable in the secure region,
wherein, in the second communication process, the second computer transmits a program causing the edge device to perform the first calculation process to the edge device.

5. The data processing method according to claim 4,
wherein, in the second communication process, the second computer transmits an instruction to delete the program to the edge device, and
wherein, in the setting process, the edge device deletes the program from the secure region.

6. The data processing method according to claim 4,
wherein the edge device stores selection information for selecting specific collected data used in the program from the collected data in the secure region, and
wherein, in the first calculation process, the edge device acquires the specific collected data in the collected data in the secure region in accordance with the selection information and calculates first data which has a data amount less than the specific collected data and is irreversible based on the acquired specific collected data.

7. The data processing method according to claim 6,
wherein, in the second communication process, the second computer transmits the selection information to the edge device, and
wherein, in the first calculation process, the edge device stores the selection information in the secure region.

8. The data processing method according to claim 1,
wherein the first data is data for evaluating a user of the collection target, and
wherein the second data is data related to a service applied to the user.

9. The data processing method according to claim 8,
wherein the collection target is a moving object which the user boards,
wherein the first data is data for evaluating driving of the moving object when the user boards, and
wherein the second data is data related to an insurance fee applied to the user or an owner of the moving object.

10. The data processing method according to claim 3,
wherein the first data is data for evaluating a user of the collection target, and
wherein the second data is data related to a service applied to the user.

11. The data processing method according to claim 10,
wherein the collection target is a moving object which the user boards,
wherein the first data is data for evaluating driving of the moving object when the user boards, and
wherein the second data is data related to an insurance fee applied to the user or an owner of the moving object.

12. The data processing method according to claim 9,
wherein, in the first calculation process, the edge device stores the collected data in the secure region and positional information of the moving object upon acquiring the collected data and calculates the first data which has a data amount less than the collected data and is irreversible based on the stored collected data,
wherein, in the first communication process, the edge device transmits the first data including the positional information to the first computer,
wherein the second calculation process is a process in which a method of calculating the second data is different between the first and second regions, and
wherein, in the second calculation process, the first computer calculates the second data related to the first region based on the first data including positional information in the first region and calculates the second data related to the second region based on the first data including positional information in the second region.

13. An edge device capable of communicating with a computer, the edge device comprising:
a processor; and
a secure region to which referring of internally stored information from outside is not allowable,
wherein the processor performs
a calculation process of acquiring collected data from a collection target, storing the collected data in the secure region, and calculating data which has a data amount less than the collected data and is irreversible in the secure region based on the stored collected data, and
a communication process of transmitting the data calculated through the calculation process to the computer.

14. The edge device according to claim 13,
wherein selection information for selecting specific collected data used in a program performing the calculation process from the collected data is stored in the secure region, and
wherein, in the calculation process, the processor stores the specific collected data in the collected data in the secure region in accordance with the selection information and calculates first data which has a data amount less than the specific collected data and is irreversible in the secure region based on the stored specific collected data.

15. A data processing system comprising:
an edge device configured to acquire collected data from a collection target; and
a first computer configured to be capable of communicating with the edge device,
wherein the edge device performs a calculation process of storing the collected data in a secure region to which referring of internally stored information from outside is not allowable and calculating first data which has a data amount less than the collected data and is irreversible in the secure region based on the stored collected data, and performs a communication process of transmitting the first data calculated through the calculation process to the first computer, and wherein the first computer performs a second calculation process of calculating second data based on the first data transmitted from the edge device through the communication process.

* * * * *